INVENTORS
William L. Maxson,
Peter J. McLaren,
BY William A. Black, and
Macon Fry

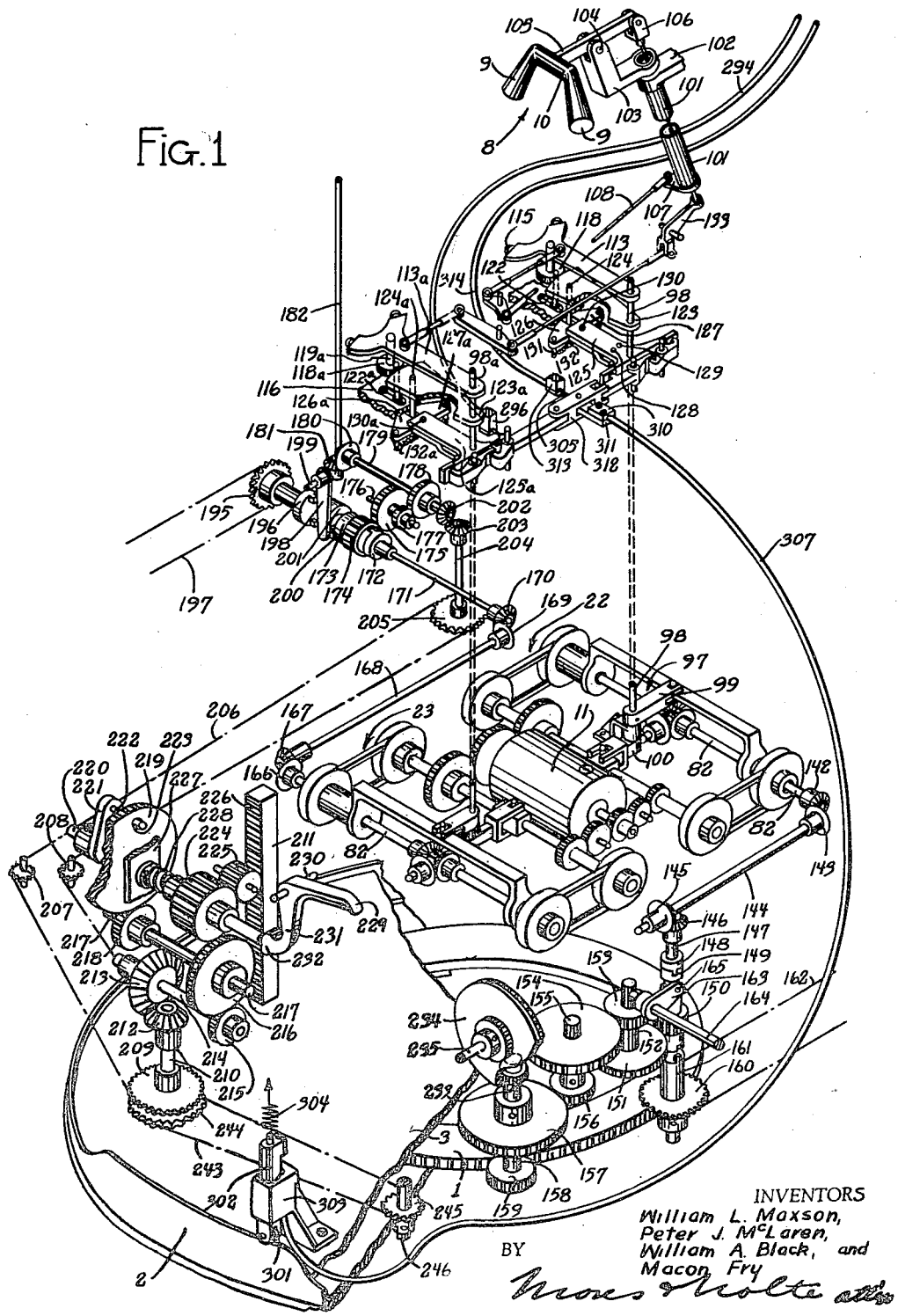

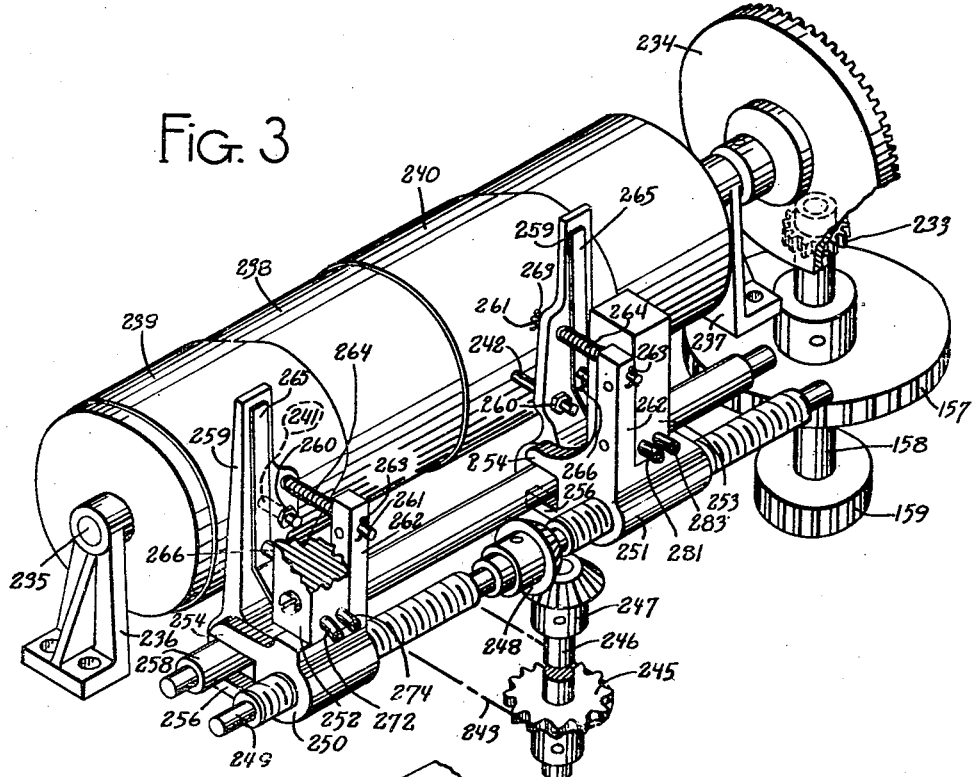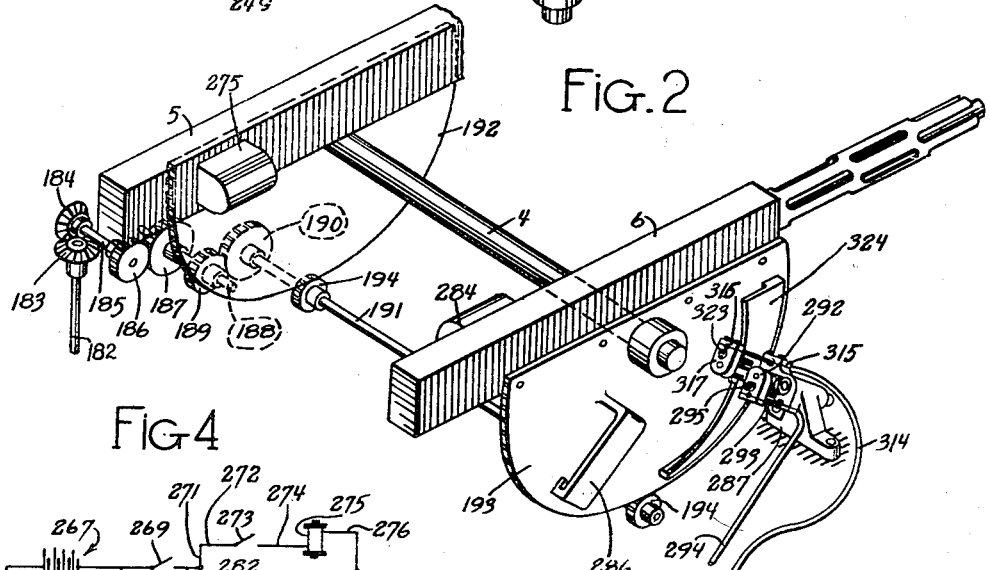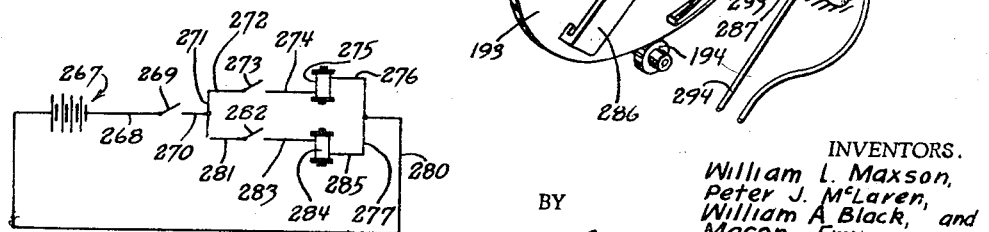

Aug. 31, 1948.  W. L. MAXSON ET AL  2,448,450
AIMING MECHANISM
Filed Jan. 27, 1942  8 Sheets-Sheet 4

INVENTORS.
William L. Maxson,
Peter J. M<sup>c</sup>Laren,
William A. Black and
Macon Fry
BY Moses & Nolte
atty INVENTORS
William L. Maxson,
Peter J. M<sup>c</sup>Laren,
William A. Black and
Macon Fry Aug. 31, 1948.  W. L. MAXSON ET AL  2,448,450
AIMING MECHANISM
Filed Jan. 27, 1942  8 Sheets-Sheet 7
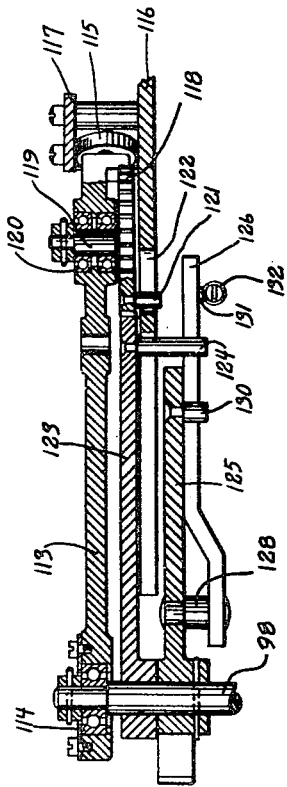
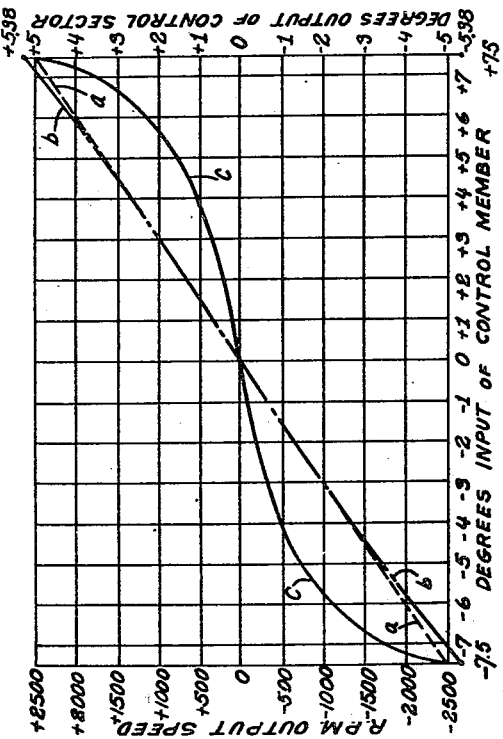
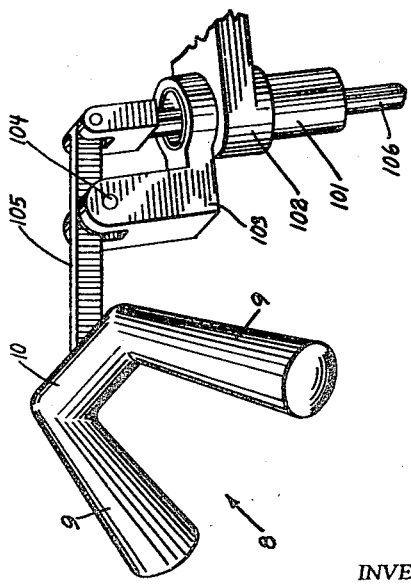
INVENTORS
William L. Maxson,
Peter J. McLaren,
William A. Black and
Macon Fry
BY Aug. 31, 1948.   W. L. MAXSON ET AL   2,448,450
AIMING MECHANISM
Filed Jan. 27, 1942   8 Sheets-Sheet 8
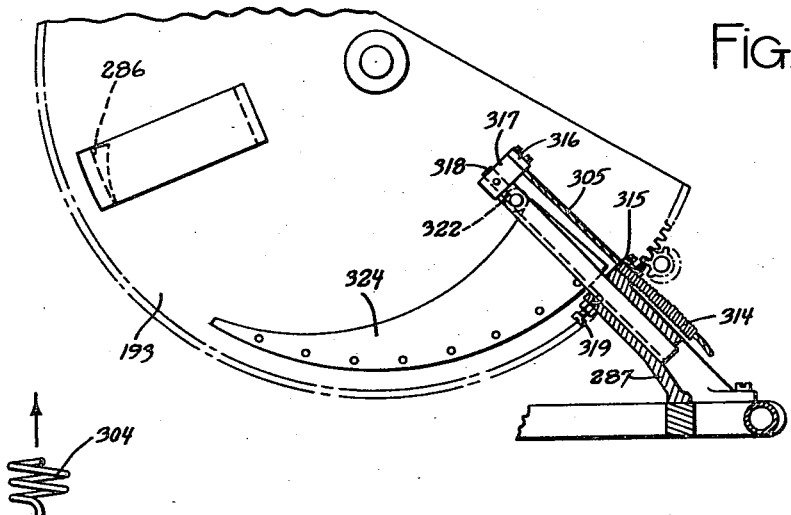
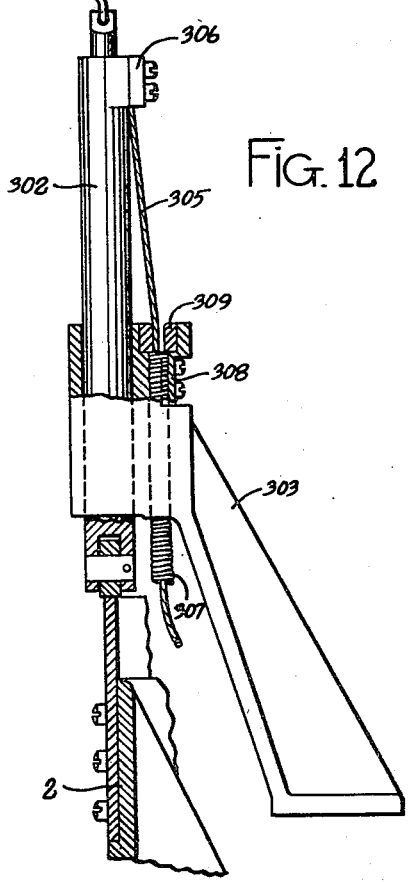
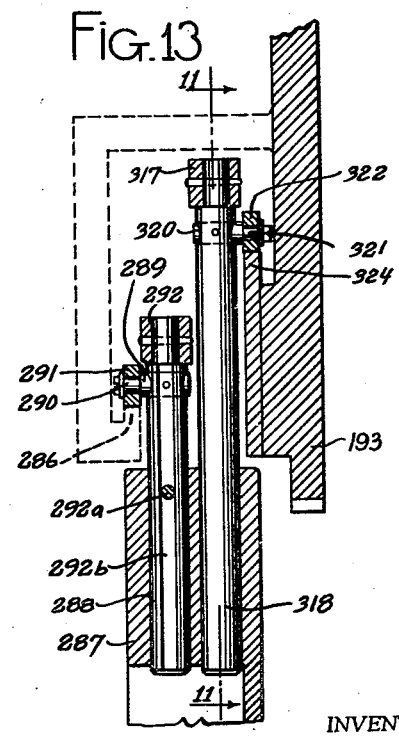
INVENTORS
William L. Maxson,
Peter J. McLaren,
William A. Black and
Macon Fry
BY Patented Aug. 31, 1948

2,448,450

UNITED STATES PATENT OFFICE 2,448,450

AIMING MECHANISM

William L. Maxson, West Orange, N. J., Peter J. McLaren, New York, N. Y., and William A. Black, Montclair, and Macon Fry, Harrington Park, N. J., assignors, by mesne assignments, to The W. L. Maxson Corporation, New York, N. Y., a corporation of New York Application January 27, 1942, Serial No. 428,372

20 Claims. (Cl. 89—41)

This invention relates to power operated aiming mechanism. The invention may find utility on land, on sea, or in the air, and in connection with telescopes, searchlights, scanners, guns, and other devices including an aimed member whose line of sight is required to be brought to bear upon a stationary or movable target.

The particular embodiment of the invention chosen for illustration is especially designed for use, and is used, in connection with guns and gun turrets on aircraft. The invention is illustratively described herein as applied to such use.

In such an organization it is desirable that the operating mechanism be responsive to a single control member for controlling movements of the aimed member in elevation and in azimuth about perpendicularly related axes; that the control member require little manual force for its operation; that the mechanism provide for rapid operation of the aimed member when the line of sight of the aimed member is far off the target or when the line of sight on the target is changing rapidly in direction, but that the mechanism also provide for a delicate and precise adjustment of the aimed member when the direction of the line of sight on the target is changing slowly or not at all; that the mechanism provide a drive which may be positive or negative, of infinitely variable ratio, and without any dead spot; that the mechanism be self-locking against the aimed member and against aerodynamic torques; that the mechanism be light in weight; that the mechanism require no fine tolerances in manufacture; that the mechanism be rugged and dependable; that the mechanism require little supervision and repair and that it call for little training of service personnel; that the mechanism be not readily susceptible to damage or disorganization by exposure to extraneous matter such as sand; that the mechanism be unaffected by changes in atmospheric pressure and temperature; and that the mechanical efficiency be high.

Without going into the matter of prior analogous mechanisms exhaustively, it is worthy of note that the only mechanisms of this character which have been reasonably acceptable heretofore have been of the hydraulic type and of the electro-hydraulic type. In these mechanisms dead spots are very difficult to eliminate. An infinitely variable ratio is difficult to secure and is maintained only so long as no leaks occur. Self-locking is difficult to achieve and is interfered with by the necessary presence of relief valves and by any air that may be present in the hydraulic system. Manufacturing limits in some parts are very fine, and very fine finishes are required. The mechanism is not rugged and dependable but requires frequent inspection and repair. Servicing requires a large personnel of considerable skill and training. Oil stocks and replacement parts must be kept constantly on hand. These systems present difficulties from the standpoint of sand exclusion, necessitating the use of fine filters to partially keep sand from the pumps and motors. Altitude gives rise to the necessity for air bleeding. Low temperature renders the oil viscous. High temperature thins the oil, produces differential expansion of metals, and tends to produce leaks. The vulnerability is high because the entire system is incapacitated by any slight damage sufficient to drain off the oil or to interfere with the required pressure or circulation of the oil. The mechanical efficiency is poor.

It is the primary object of the present invention to provide a purely mechanical (non-hydraulic) aiming mechanism embodying the desirable features and advantages hereinbefore referred to.

To this end an aiming mechanism embodying the invention is desirably made to include a rotary turret mounted for rotation about a vertical axis (in which the operator rides), an aimed member mounted thereon for horizontal movement in unison therewith and also for movement about a horizontal axis relative thereto, a motor mounted on the turret and desirably adapted for operation at constant speed, a pair of uninterruptedly adjustable, mechanical, speed converting devices mounted on the turret and driven independently by the motor for securing in each instance as an output from the motor an output speed of rotation in either of two opposite directions of any desired value within predetermined limits, means responsive to the first of the converting devices for rotating the turret about its vertical axis in linear relation to the output speed of the first device, means responsive to the second of the converting devices for rotating the aimed member about its horizontal axis in linear relation to the output speed of the second device, a common manual control member on the turret for adjusting the speed converting devices, said control member being rockable to the right or left relative to the turret from the azimuth neutral attitude corresponding to zero output speed of the first device to produce output speeds in either of two opposite directions depending upon whether the control member is displaced to one side or the other of the azimuth neutral attitude, and being also rockable about a horizontal axis in opposite directions from the elevation neutral attitude corresponding to zero output speed of the second device to produce speeds in either of two opposite directions depending upon the direction of the displacement of the control member relative to the elevation neutral attitude, and non-linear control connections from the control member to each of the speed converting devices, the first constructed and arranged to cause the output speed of the first converting device to be increased in progressively augmented relation to the extent of departure of the control member to the right or left from the azimuth neutral attitude, and the second constructed and arranged to cause the output speed of the second converting device to be increased in progressively augmented relation to the extent of departure of the control member up or down from the elevation neutral attitude.

It is a further object of the invention to provide safety means coordinated with the operations of the aimed member (gun) in azimuth and in elevation for overriding the effect of the manual control member upon the speed converting devices and asserting a superseding control, to reduce the output speeds of said devices to zero and thereby prevent the pointing of the gun in proscribed directions; for example, toward the tail group, upper fuselage, pilot's hood, and propeller arc or arcs.

It is still another object of the invention to provide safety means coordinated with the operations of the aimed member (gun) in azimuth and elevation for suppressing the fire of the gun in proscribed directions toward which the gun may be pointed; for example, toward a wing of the aircraft.

Other objects and advantages will hereinafter appear.

No claim is made herein to the velocity converting mechanism per se. That mechanism is disclosed and claimed in the divisional application of William L. Maxson and William A. Black, Serial No. 545,134, filed July 15, 1944, for Velocity converting mechanism.

In the drawing forming part of this specification:

Figs. 1 and 2 are complementary perspective, fragmentary views, partially diagrammatic and with some of the parts spread vertically for clearness, illustrating the principal controlling and operating elements of a practical and advantageous aiming mechanism embodying the invention which has been chosen for illustrative purposes;

Fig. 3 is a fragmentary perspective view of fire suppression control cams, the immediate operating means therefor, and safety switches operated thereby;

Fig. 4 is a diagrammatic view illustrating the fire control circuit of a single gun;

Fig. 6a is a fragmentary detail view illustrating a portion of the elevation control transmission train;

Fig. 8 is a view in sectional side elevation, of non-linear control connections interposed between the manual control member and one of the speed converting devices;

Fig. 9 is a fragmetary perspective view illustrating the manual control member and the mounting therefor;

Fig. 10 is a graph designed to illustrate particularly the non-linear relation of output speed to the displacement of the manual control member which is secured by virtue of the non-linear control connections interposed between the manual control member and each of the speed converting devices;

Fig. 11 is a fragmentary view in sectional side elevation illustrating particularly the elevation control cams and the follower of one of them;

Fig. 12 is a fragmentary view in sectional side elevation illustrating the azimuth control cam and its follower;

Fig. 13 is a fragmentary sectional view illustrating the elevation cams of Fig. 11 and the followers of both of them.

Figure 1A:
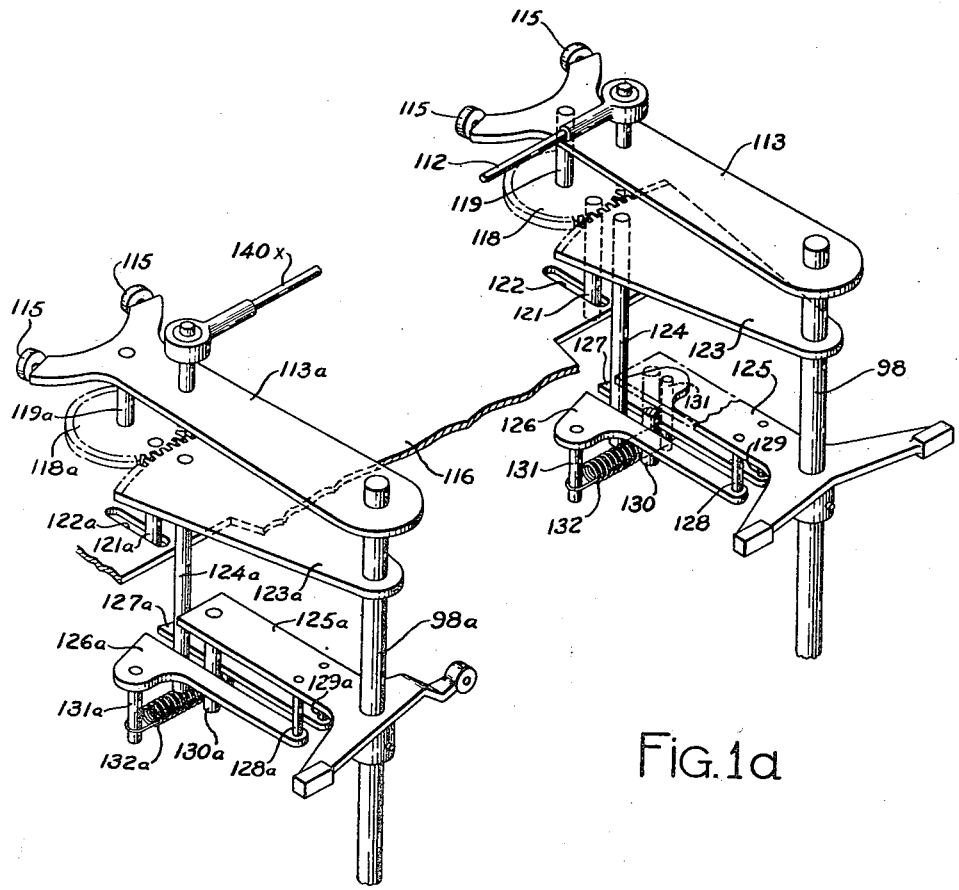
Fig. 1a is a fragmentary view, similar to Figs. 1 and 2, but on a larger scale than Figs. 1 and 2 and further exaggerated in the vertical dimension, showing portions of the control transmission mechanisms of Fig. 1.

All the mechanism illustrated in the drawing with the exception of a stationary ring gear 1 and a stationary annular cam 2 (see Fig. 1) is either a part of, or is mounted upon, a rotary turret, the bottom plate 3 of which is illustrated in part in Figure 1. The turret carries a horizontal shaft 4 (see Fig. 2) upon which two guns 5 and 6 are mounted for rotation in elevation about the axis of the shaft 4 in unison with one another, and for rotation in azimuth about the vertical axis of the turret in unison with the turret.

The operator rides in the rotary turret upon a seat (not shown) which is supported upon a seat post 211. The seat post raises the seat as the guns are lowered, and lowers the seat as the guns are raised, in order to make it easy for the operator to keep his eye in line with the gun sights.

The operator controls the operation of the turret and the guns in azimuth and of the guns in elevation by means of a single manual control member 8 which comprises cross bar 10 and a pair of handles 9 rigid with the cross bar. The handles 9 may be swung to a limited extent to the right or left from a neutral attitude to cause a constant speed motor 11 to drive the turret in one direction or the other about the vertical axis thereof, depending upon the direction in which the handles are swung from neutral. The handles 9 may be also swung up or down, to a limited extent, from a neutral attitude to cause the motor 11 to raise or lower the guns 5 and 6, depending upon the direction in which the handles are swung from neutral.

The motor outputs are transmitted through speed converting devices each of which is controlled by the operator through the control member 8. The mechanism is so devised that the speed of the drive in azimuth is in progressively augmented relation to the extent of displacement of the control member 8 to the right or left from the azimuth neutral, and the speed of the drive in elevation is in progressively augmented relation to the extent of displacement of the control member 8 up or down from the elevation neutral. The control member may be displaced up or down and simultaneously to the right or left to secure simultaneous operations in azimuth and in elevation, each appropriate in speed to the requirements of the existing situation. The attitude of the operator in relation to the control member 8 is not changed by rotation of the turret because the control member and the operator turn in unison with the turret. Displacement of the control member 8 to the right or left to effect rotation of the turret is displacement to the right or left relative to the turret. The relationship of the control member to the turret when in the azimuth neutral is always the same, regardless of the orientation of the turret.

Figure 5:
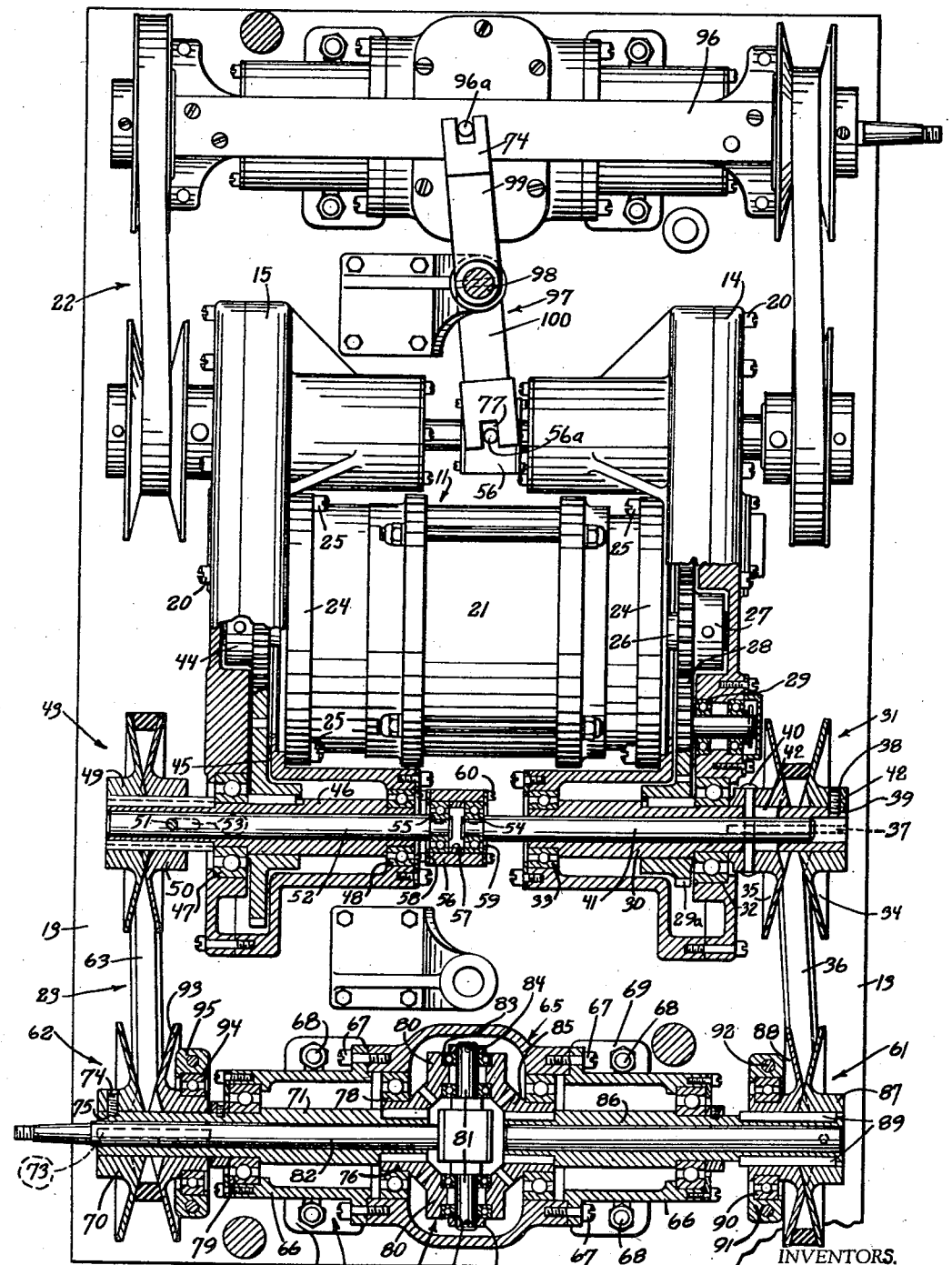
Fig. 5 is a sectional plan view, partly broken away, illustrating particularly the driving motor and the speed converting devices operated thereby.
Figure 6:
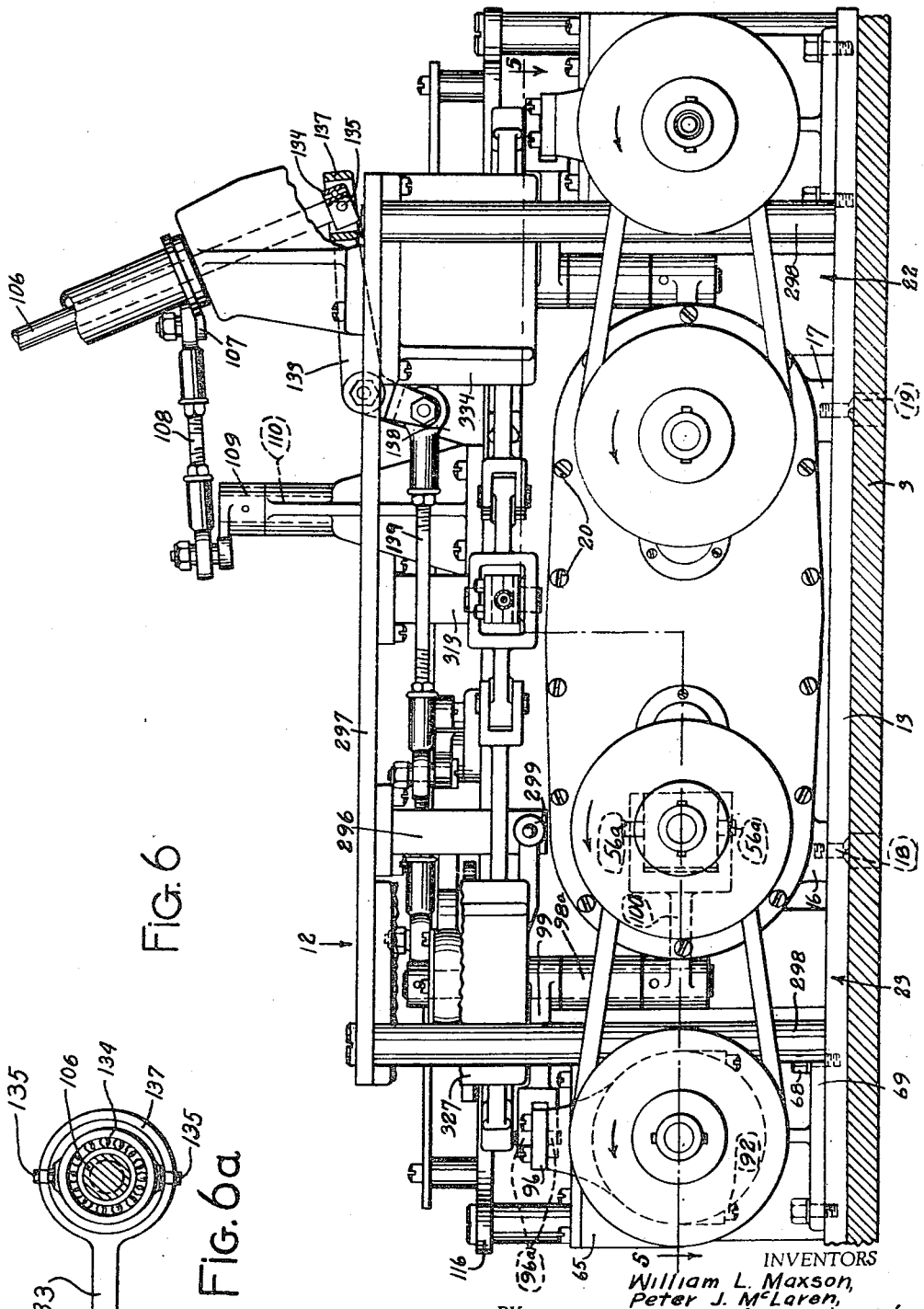
Fig. 6 is a fragmentary view in sectional side elevation, partly broken away, illustrating principally the motor, the speed converting devices driven thereby, and a portion of the means for adjusting and controlling the speed converting devices.

The constant speed motor 11 and the speed converting devices constitute a unit 12 (see Figs. 5 and 6) which comprises a base plate 13 fixedly supported from the bottom plate 3 of the turret. Mounted upon the base plate 13 are right and left housings 14 and 15. The housings 14 and 15 are secured to the base plate 13 by means of feet 16 and 17, in which are threaded screws 18 and 19. Each housing consists of two sections held together by means of screws 20. These housings 14 and 15 are complementary to the motor casing and to one another, and together with the motor casing they house and support the motor 11, the output gearing for the motor, and the major portions of the input shafts of front and rear speed converting devices 22 and 23. The motor casing 21 is provided with annular flanges 24 at its opposite ends, through which it is secured by screws 25 to the housings 14 and 15.

The speed converting devices 22 and 23 are so nearly identical that a description of one of them may be taken as equally applicable to the other. The same reference characters are applied to corresponding parts of the two devices.

The output shaft 26 of the motor 11 has fast upon one of its ends an output gear 27. The gear 27 drives a gear 28 which is revolubly mounted in the housing 14 by means of ball bearings 29. The gear 28, in turn, drives a gear 29a which is fast upon a drive sleeve 30 of an adjustable input pulley 31. The sleeve 30 is revolubly supported in the housing 14 by means of ball bearings 32 and 33.

The pulley 31 comprises fixed and adjustable sections 34 and 35 which are formed with confronting, frusto-conical faces for engaging opposite sides of a V-belt 36 to drive the belt. The outer fixed pulley section 34 is secured upon the outer end of the sleeve 30 with provision for ready removal and reapplication to facilitate belt replacement, by means of a key 37 and of a set screw 38 which is turned into a recess 39 of the sleeve. The inner, adjustable pulley section 35 is fixed by means of a pin 40 to a shaft 41 which is slidably supported in an axial bore of the sleeve 30. The pin 40 passes through slots 42 of the sleeve 30, the slots serving to permit limited movement of the pin 40 and the shaft 41 relative to the sleeve 30 in the direction of the common axis of the sleeve and shaft. The pin 40 constrains the sleeve 30 and the shaft 41 to rotate in unison with one another, and hence compels the sections 34 and 35 of the pulley 31 to rotate in unison with one another. Axial movement of the shaft 41 relative to the sleeve 30 serves to change the width of the pulley 31, and thereby to change the pitch of the pulley.

The other input pulley 43 is driven from a gear 44 fast upon the opposite end of the motor shaft 26 from the gear 27. The gear 44 drives a gear 45 which is fast upon drive sleeve 46 of the pulley 43. The drive sleeve 46 is revolubly supported in the housing 15 by means of ball bearings 47 and 48. The pulley 43 is the same in construction and size as the pulley 31 and comprises relatively adjustable, fixed and movable sections 49 and 50. The outer, fixed section 49 of the pulley 43 is fixedly secured on the sleeve 46 in the same manner that the pulley section 34 is secured upon the sleeve 30. The inner, adjustable section 50 of the pulley 43 is secured by means of a pin 51 to a shaft 52 which is slidable in an axial bore of the sleeve 46, the pin as before passing through slots 53 of the sleeve 46.

Because of the interposition of the gear 28 between the gears 27 and 29a, the sleeve 30 and the shaft 41 are driven in the same direction as the motor shaft 26. Because the gears 44 and 45 directly intermesh, the sleeve 46 and the shaft 52 are driven in the opposite direction from that in which the motor shaft 26 rotates. In all other respects the drives to the input pulleys 31 and 43 are identical, the drive ratios are identical, and the pulleys themselves are identical.

The inner extremities of the shafts 41 and 52 are reduced, and upon these reduced portions the inner races of ball bearings 54 and 55 are made fast. The outer races of the bearings 54 and 55 are confined in a cage 56 which is formed with flat external top and bottom surfaces. The outer races of the bearings are held in contact with a spacer ring 57 by means of retainer plates 58 and 59, the retainer plates being secured to the opposite ends of the cage 56 by means of screws 60.

Means for shifting the cage to vary the pitches of the input pulleys 31 and 43 will be described a little farther on. It should be noted, however, that the shaft assembly (shaft 41, cage 56, and shaft 52) which together constitute a rigid member connecting the adjustable sections 35 and 50 of the pulleys, is of such length that the pulleys are adjusted to an intermediate, equal pitch when the cage is centralized, but that movement of the cage laterally away from this centralized position increases the pitch of one pulley and concomitantly reduces the pitch of the other, the cage serving by its adjustment inversely to control the pitches of the input pulleys.

The pulley 31 drives a similar adjustable pulley 61 through the V-belt 36, and the pulley 43 drives a similar adjustable pulley 62 through a V-belt 63 which is like the belt 36. The pulleys 61 and 62 form parts of an assembly which is supported from the base plate 13 by a differential housing 64. The housing consists of a central portion 65 and side portions 66 which are held together by screws 67. The assembly is mounted on the base plate 13 by means of bolts 68 which pass through flanges 69 formed on the side portions 66 of the differential housing 64.

The outer, fixed section 70 of the pulley 62 is secured to a sleeve 71 by means of keys 73 and a set screw 74 which enters a recess 75 formed in the sleeve. The sleeve 71 has fixed upon its inner extremity a bevel gear 76 which constitutes one input arm of a differential gear 77. The sleeve 71 is revolubly supported in the differential housing 64 by means of ball bearings 78 and 79. The spider gears 80 of the differential gear 77 are mounted on arms 81 of differential output shaft 82 by means of ball bearings 83. The gear and ball bearing assemblies are held in place by means of suitable retainer rings 84 pinned to the arms 81.

A bevel gear 85 forms the other input arm of the differential 77. This gear is mounted upon a sleeve 86 which is constructed and mounted in the manner already described with reference to the sleeve 71 and which is connected to the outer, fixed section 87 of the pulley 61 in the same manner that the sleeve 71 is connected to the outer, fixed section 70 of the pulley 62.

The inner, adjustable section 88 of the pulley 61 is slidably mounted upon the sleeve 86, but is held against rotation relative thereto by keys 89. Secured to the hub portion of the pulley section 88 is a ball bearing 90 which is held in a retainer 91. The retainer 91 is made of two portions which are held together by means of screws 92.

The inner, adjustable section 93 of the pulley 62 is similarly slidable axially of sleeve 71, but is held against rotation relative to the sleeve by means of the keys 73. The pulley section 93 has secured to it a ball bearing 94 which is mounted in a split retainer 95. The retainers 91 and 95 are secured to one another through a rigid bar 96, similar to that shown on the unit 22, which is adjustable to the left or right to increase the pitch of one of the output pulleys and concomitantly to diminish the pitch of the other of the output pulleys.

The cage 56 and the bar 96 are concurrently moved equal distances and in opposite direction by an operating lever 97. The operating lever comprises a vertical shaft 98, an upper double-forked arm 99 fast on the shaft for operating the bar 96 through upper and lower pins 96a, and a diametrically aligned lower double-forked arm 100 fast on the shaft for operating the cage 56 through upper and lower pins 56a. The double-forked arms 99 and 100 serve both to operate the associated members 96 and 56 axially, and to restrain the latter members against rotation. When the lever 97 is in neutral position, the pitches of the pulleys 31 and 43 are equal, and the pitches of the pulleys 61 and 62 are equal. The sleeves 71 and 86 are, therefore, rotated at equal speeds but in opposite directions. These equal and opposite rotations cancel one another through the differential gear 77, so that there is no output to the shaft 82. Each V-belt with its associated input and output pulleys, however, constitutes a speed converting element capable of producing a step-up or a step-down ratio of output to input.

Turning of the lever in one direction from neutral diminishes the pitch of pulley 31 and correspondingly increases the pitch of the pulley 61, thereby reducing the speed of rotation of the sleeve 86. The same movement of the lever 97 increases the pitch of the pulley 43 and correspondingly diminishes the pitch of the pulley 62, thereby increasing the speed of the sleeve 71. Under these conditions the sleeve 71 rotates faster than the sleeve 86, and the differential combines the unequal, opposed rotations to produce an output rotation of the shaft 82 which is in the direction of rotation of the sleeve 71 and equal in speed to one-half the difference of the rotational speeds of the sleeves 71 and 86. The change of speed of the shaft 82 occurs progressively and uninterruptedly as the lever 97 is moved farther and farther away from the neutral position until the maximum speed of rotation of the shaft 82 in the direction of rotation of the sleeve 71 is attained under the conditions illustrated with reference to the rear speed converting device 23 in Fig. 5.

Movement of the lever 97 in the opposite direction from neutral causes exactly the reverse conditions to occur, so that sleeve 86 is driven at higher speed than the sleeve 71, and the output shaft 82 is caused to rotate in the direction of sleeve 86 and at a speed which is one-half the difference of the speeds of sleeves 86 and 71. The rear speed converting device 23 is for driving the guns in elevation, and the forward speed converting device 22 is for driving the turret and the guns in azimuth.

The output speed of rotation of either device is substantially a linear function of the extent of angular departure of its lever 97 from the neutral condition. The relationship is not truly linear, but it is nearly so because there is an increasing slip of the V-belts as the output speed increases. It is desirable, however, that the turret and/or guns be not too sensitively responsive to the control member 8 when they have been properly trained or nearly so, and the line of sight on the target is changing direction slowly, but that they be responsive in progressively amplified degree to displacement of the control member as the control member moves away from neutral, so that, notwithstanding the relatively slight initial response to the control member, extensive and rapid operation may be secured from a limited range of movement of the control member when extensive and rapid operation is required.

It is a feature of the invention that non-linear control connections are provided between the manual control member 8 and each of the speed converting devices 22 and 23 for bringing about a desirable law of augmentation of response of the speed converting device in either direction, and that the control connections are so contrived that the law of augmentation will be the same in one direction as the other.

The manual control means comprises a tubular shaft 101 which is revolubly mounted in a fixed bracket 102 (Fig. 9) of the turret. The shaft 101 has affixed to its upper end a bifurcated pivot block 103 which carries a fulcrum pin 104 for a lever portion 105 of the manual control member 8. One arm of the lever member 105 has rigid with it the cross bar 10. The other arm is pivotally connected to the upper end of a link 106. The manual control member 8 is free to turn about the axis of the tubular shaft 101, and when it is so turned it rotates the shaft 101 in unison with itself. The manual control member 8 is also free to rock up and down about the fulcrum pin 104, and when so rocked it operates the link 106 lengthwise.

Turning of the shaft 101 controls the azimuth speed converting device 22, and endwise displacement of the link 106 controls the elevation speed converting device 23.

The shaft 101, at the lower end thereof, has affixed to it an arm 107 (see Figs. 1 and 7) which is connected through an adjustable link 108 to a crank 109 fast on a vertical shaft 110. The shaft 110 also has fast upon it a crank 111 which is connected through an adjustable link 112 to a swinging arm 113. The arm 113 is revolubly mounted upon the shaft 98 of the speed converting device 22 by means of a ball bearing 114 (see Fig. 8), and is equipped with supporting rollers 115 which ride upon a stationary plate 116 and beneath a hold-down plate 117. A planetary pinion 118 is fast upon a downwardly extending shaft 119, which shaft is revolubly mounted in the arm 113 by means of a ball bearing 120 (see Fig. 8). The pinion 118 has fixed upon its margin a downwardly extending pin 121 which plays in a cam slot 122 formed in the plate 116, and serves to determine and control the extent of rotation of the pinion 118 produced by a given operation of the arm 113. The pinion has driving engagement with a toothed sector 123, which sector is mounted on the shaft 98 with capacity for rotation relative thereto.

The arm 113, the pinion 118, the pin 121, the slot 122, and the sector 123 constitute the means for producing and determining the non-linear law of response of the speed converting device 22 in relation to displacement of the manual control member 8 to the right or left. As illustrated in Figs. 1, 1A and 8, the parts are in a neutral condition. The shaft 98, the shaft 119 of pinion 118, the pin 121 affixed to the pinion 118, and the pin 124 affixed to the sector 123 are all in what may be termed the neutral plane.

When arm 113 is operated to carry the pinion axis to one side or the other of the neutral plane, however, only the shaft 98 and the pin 121 (constrained by the straight stationary slot 122) remain in that plane. The pinion shaft 119 is moved with the arm 112, carrying the pinion 118 bodily with it in a planetary path about the shaft 98 which defines also the axis of the sector 123. If the pin 121 were not confined in the slot 122, and the pinion 118 were fixed against rotation about its own axis, turning of the arm 113 would compel the sector 123 to turn in unison with the arm. Rotation of the pinion about its own axis, however, is not only permitted but is compelled and controlled by the coaction of the pin 121 and the slot 122, the effect being to turn the sector 123 in the opposite direction from the neutral plane to that in which the arm 113 is turned from the neutral plane. The input angle is the angle through which the arm 113 is turned, and the output angle is the angle through which the sector 123 is turned in the opposite direction. The described parts impose a definite law of relationship of output angle to input angle which is graphically portrayed in Fig. 10. It will be observed that the slope of the output-input curve increases progressively from the neutral point outward in either direction. It is evident, therefore, that the ratio of output rate to input rate increases progressively as the total extent of input is increased to either side of neutral.

While the sector 123 is not fast with the shaft 98, it is yieldingly connected to cause the shaft 98 to turn in unison with itself under normal operating conditions. Operation of the sector 123 is transmitted yieldingly to the shaft 98 in order that the manual control member may be overridden and superseded in its effect upon the speed converting device 22 under certain operating conditions. This yielding connection will be described at this point and the overriding mechanism will be described and explained later.

Such yielding transmission is effected through a downwardly extending pin 124 carried by the sector 123, and a three-arm lever 125 fast on the shaft 98 (see Figs. 1, 1A and 8). The lever 125 has arms 126 and 127 pivoted upon it side by side, by means of independent fulcrum pins 128 and 129. A stop pin 130 extends downward from the lever 125 between the arms 126 and 127. Each of the arms 126 and 127 carries a downwardly extending pin 131, and the pins 131 of the two arms are connected to one another and drawn toward the stop pin 130 by means of a tension spring 132. The pin 124 on the sector 123 extends downward between the arms 126 and 127, so that motion of the sector in either direction is transmitted to the lever 125 and the shaft 98 through the spring 132. The spring is stiff enough to prevent yielding under normal operating conditions, but will yield when the lever 125 is forced to a position out of harmony with the position of the sector 123.

The graph of Fig. 10 includes three curves which are designed to bring out the relationship of output speed of a converting device (say 22) relative to the displacement from neutral of the manual control member 8 of the illustrative mechanism. In this graph, input degrees of the manual control member are taken as abscissas, the output revolutions per minute of the speed converting device are taken as ordinates. The first curve $a$ is a straight line and shows the relationship of output speed to control member displacement as it would be if the relationship were a linear one. In other words, the line $a$ is a straight line. The curve $b$ shows the relationship of output speed to control member displacement which would be secured by the speed converting device if the shaft 98 were operated in linear relation to the manual control member 8. As will be seen, the curves $a$ and $b$ are practically identical.

The curve $c$ shows the true relationship of output speed to operation of the manual control member 8 as the illustrative mechanism is actually constructed. Since the curves $a$ and $b$ are, to all intents and purposes, identical, the curve $c$ may also be regarded as showing the relationship of the displacement of the shaft 98 to displacement of the manual control member 8. It will be seen that the curve $c$ is symmetrical with reference to the axis of abscissas, and that it is also symmetrical with relation to the axis of ordinates. In other words, the same law of augmentation prevails for positive outputs when the manual control member 8 is moved in one direction from neutral and for negative outputs when the manual control member 8 is moved in the other direction from neutral. The graph of Fig. 10 is equally applicable to the speed converting device 22 and the control means for the device 22, and to the speed converting device 23 and the control means for the speed converting device 23.

The control connections for the speed converting device 23 are in large part identical with the control connections for the converting device 22 as already described. The link 106 is universally connected at the lower end thereof with a bell crank lever 133 so as to accommodate rotation of the link in unison with the manual control member 8, and relative to the bell crank lever, and also to provide for relative pivotal movement of the link 106 and the lever 133 which is incidental to the rocking of the lever 133 in response to longitudinal movements of the link. The link 106 has affixed to the lower end thereof an inner race of a ball bearing 134. The outer race of the bearing 134 supports diametrically opposed bearing pins 135 which are rotatably mounted in a surrounding ring 137 formed by the forward end of the lever 133.

The lever 133 is fulcrumed upon a stationary bearing bracket 138, and is connected through an adjustable link 139 with a horizontal lever 140 which is fulcrumed on a stationary bearing bracket 141. The lever 140 is connected through an adjustable link 140x with an arm 113a which is like the arm 113 of the control connections for the speed converting device 22. The remaining elements for transmitting motion from the arm 113a to the shaft 98a of the speed converting device 23 are identical with the corresponding elements for transmitting motion from the arm 113 to the shaft 98 of the speed converting device 22. Corresponding reference characters have been applied to corresponding parts with the subscript "a" added in each instance, and no further description of these parts is deemed necessary.

The speed converting device 22 drives the turret and guns in azimuth. The output shaft 82 of the speed converting device 22 has affixed to the outer end thereof a bevel pinion 142 which, through a bevel pinion 143 drives a shaft 144. The shaft 144, through bevel pinions 145 and 146, drives a shaft 147. The shaft 147 has fast upon it a clutch member 148 which is adapted when engaged therewith to drive a shiftable clutch member 149, the clutch member 149 being mounted on the shaft with capacity for axial and rotative movements relative thereto. The clutch member 149 has fast with it a broad toothed gear 150 which is constantly in mesh with a gear 151 fast on a shaft 152. A gear 153, also fast on the shaft 152, drives a gear 154 fast on a shaft 155. A gear 156 also fast on the shaft 155 drives a gear 157 which is fast on a shaft 158. A gear 159 also fast on the shaft 158 meshes with the stationary ring gear 1, and is effective through its rotation to drive the turret about the turret axis. The described train from speed converting device 22 to the gear 1 operates the turret and the guns in azimuth in linear relation to the output speed of the device 22.

The shaft 147 also has revolubly mounted upon it a sprocket 160 and a clutch member 161 fast with the sprocket. The sprocket 160 is adapted to be driven manually through a chain 162. The manual drive is provided as an alternative for the power drive in the event of any failure of power or of damage to the power drive which does not affect the manual drive. A crank 163, fast on a clutch pedal shaft 164, is provided with a clutch shifting pin 165 which rides in a circumferential groove of the clutch member 149. The clutch is normally spring biased to the position illustrated in Fig. 1 to make the power drive effective, but it may be shifted and held downward by pedal operation to disconnect the clutch members 148 and 149 and to connect the clutch members 149 and 161.

The speed converting device 23 drives the guns in elevation. The output shaft 82 of the speed converting device 23 has affixed to one end thereof a pinion 166. This pinion drives a pinion 167 fast on a shaft 168, and a second pinion 169, also fast on the shaft 168, drives a pinion 170 fast on a shaft 171. The shaft 171 has fast upon it a clutch member 172. A clutch member 173, which is free for movement axially and rotatively of the shaft 171, has fast with it a broad toothed pinion 174 which is constantly in mesh with a gear 175 fast upon a shaft 176. The shaft 176 also has fast upon it a gear 177 which drives a gear 178 fast upon a shaft 179. The shaft 179, through bevel pinions 180 and 181, drives a shaft 182, which shaft has fast upon it a bevel pinion 183 (Fig. 2). The bevel pinion 183, through a bevel pinion 184, a shaft 185, a gear 186, a gear 187, a shaft 188, and gears 189 and 190, drives a shaft 191 for operating the gun elevating sectors 192 and 193 trough pinions 194 fast on the shaft 191. The sectors 192 and 193 are mounted upon the horizontal shaft 4 and turn in unison with one another about the axis of the shaft. The gun 5 is rigidly attached to the sector 192, and the gun 6 is rigidly attached to the sector 193. The described train from speed converting device 23 to the guns operates the guns in elevation in linear relation to the output speed of the device 23.

The shaft 171, which carries the clutch member 173, has revolubly mounted upon it a sprocket 195, and the sprocket 195 has fast with it a clutch member 196. The sprocket 195 is adapted to be manually operated through a chain 197. A clutch shifting arm 198, fast upon a clutch pedal shaft 199, is equipped with a shifting pin 200 which rides in a circumferential groove 201 of the clutch member 173. The arm 198 is normally spring biased to the position illustrated in Fig. 1 for making the power operating mechanism effective. It may be pedal operated to carry the clutch member 173 toward the left for disengaging the clutch member 172 and engaging the clutch member 196, so as to make the power operating mechanism ineffective and the manual operating mechanism effective.

The shaft 179 also has fast upon it a bevel pinion 202 which drives a bevel pinion 203 fast on a shaft 204. A sprocket 205, fast on the shaft 204, drives a chain 206 which runs around idler guide sprockets 207 and 208 and drives a sprocket 209 fast on a shaft 210. This chain and sprocket mechanism is for operating the seat elevating post 211 in coordination with the raising and lowering of the guns.

The shaft 210 has fast upon it a bevel pinion 212 which drives a bevel gear 213 fast on a shaft 214. A gear 215, fast on the shaft 214, drives a gear 216 fast on a shaft 217. The shaft 217 also has fast upon it a gear 218 which drives a gear 219. The gear 219 is revolubly mounted upon a shaft 220. The shaft 220 has fast upon it a crank 221 having a crank pin 222 which normally passes through a hole 223 formed in the gear 219 for causing the shaft 220 to be driven by the gear 219. The shaft 220 also has fast upon it a gear 224 which through a gear 225 drives the seat post 211, the seat post being provided with rack teeth 226. The illustrated condition, as seen in Fig. 1, is the normal condition of the parts, so that under normal conditions the seat post is caused to rise as the guns are lowered, and is caused to descend as the guns are raised.

It is desirable, however, that provision also be made for manually adjusting the seat post relative to the power operating means in accordance with the height of the operator. The shaft 220 is mounted in a supporting plate 227 with capacity for axial movement. A compression coil spring 228, interposed between the plate 227 and the hub of gear 224, urges the shaft 220 toward the right for projecting the pin 222 through the hole 223 of the gear 219, and for normally maintaining the pin in such projected position.

A clutch pedal 229 is pivotally supported by means of a shaft 230. The clutch pedal is in the form of a bell crank lever, the lower arm 231 of which is provided with an actuating head or cam 232 for engaging one end of the shaft 220 and operating the shaft axially toward the left against the resistance of the spring 227. When the clutch pedal 229 is depressed, the shaft 220 is rendered free to rotate relative to the power driving gear 219, so that the seat and seat post may be manually raised or lowered. The seat is manually lowered to permit the operator to get out of the turret. When the operator gets into the turret and takes his place on the lowered seat, he raises the seat to substantially the proper height by manual adjustment. When the seat has been raised to approximately the right height, the clutch pedal 229 may be released and the pin 222 will thereupon be caused to bear against the left face of the gear 219 during further adjustment of the seat, and to snap into the opening 223 of the gear 219 when it comes into alignment with the opening.

In the operation of guns upon an airplane there is a danger that the guns will be fired toward a portion of the airplane through accident or inadvertence.

In the case of some parts of the airplane, it is highly objectionable even to let a gun be pointed toward them, such parts, for example, including the tail group, the upper fuselage, the pilot's hood, and the propeller arc or arcs. In the case of other parts, such as the wings, it is preferable simply to provide means for preventing the firing of a gun so long as the gun points at the wing, while permitting the gun to be traversed across the wing.

The illustrative mechanism embodies both types of safeguard. The means for at times preventing the firing of the guns will be described first.

The shaft 158 which drives the gear 159 for rotating the turret has fast upon it a gear 233 which drives a crown gear 234. The crown gear 234 is fast upon a shaft 235 which is mounted in stationary brackets 236 and 237 (Fig. 3). The shaft 235 has fast upon it a cylinder 238 upon which sleeve cams 239 and 240 (one for each gun) are affixed in any suitable manner. Each cam is designed to control the firing circuit of one of the guns for preventing the closing of the circuit when the gun is pointed in such a direction that the firing of the gun should be prevented. The gear ratios are so chosen that the cams are caused to rotate equally with the turret. Each rotative position of the cams, therefore, corresponds to a definite rotative position of the turret.

The cams 239 and 240 act upon followers 241 and 242, respectively, which are traversed axially of the cams in proportion to the operation of the guns in elevation. Each longitudinal position of a follower relative to its associated cam corresponds, therefore, to a definite angle of elevation (positive or negative) of the guns. Each point on the cam corresponds to a definite position of the guns in azimuth and to a definite position of the guns in elevation; in other words, to a single definite direction of the guns. The cams are designed in accordance with the design of the particular airplane and the location of the guns on the airplane. The cams are not duplicates of one another, for while the two guns of a single turret are always disposed in parallel relation to one another, they are mounted so close to the airplane parts that one may be in alignment with an airplane part when the other is not.

The mechanism for operating the followers 241 and 242 comprises a chain 243 which is driven by a sprocket 244 fast upon the shaft 210 (Fig. 1). Since the train from the operating shaft 179 to the shaft 210 is a linear train, and the train from operating shaft 179 to the gun sectors 192 and 193 is a linear train, the shaft 210 is always operated in proportion to the operation of the sectors 192 and 193. The chain 243 drives a sprocket 245 fast upon a shaft 246. The shaft 246 also has fast upon it a bevel pinion 247 which drives a bevel pinion 248 that is fast upon a feed screw 249.

Feed yokes 250 and 251 are threaded upon opposite ends of the feed screw 249 and are driven in unison with one another and in proportion to the operation of the gun sectors by the rotation of the feed screw. The feed yokes 250 and 251 have affixed to them switch boxes 252 and 253 in each of which very sensitive switch mechanism of the "micro-switch" type (not illustrated in detail), is mounted. Each feed yoke is formed with two upper arms 254, and two lower arms 256. A stationary, cylindrical guide rod 258 is received between the upper arms 254 on the one hand, and the lower arms 256 on the other, and restrains the feed yokes 250 against rotation and rocking.

Associated with each guide yoke is a follower supporting arm 259. Each arm 259 is mounted upon the guide rod 258 with capacity for rocking and longitudinal movements relative to the rod. Each arm 259 is received between the right-hand pair of arms 254, 256 and the left-hand pair of arms 254, 256 of the associated feed yoke, so that it is caused to participate in the movements of the feed yoke in either direction along the screw 249. The followers 241 and 242 are threaded through the respective arms 259, and are locked in adjusted positions by lock nuts 260.

A rod 261 passes loosely through the arm 259 and an opposed upstanding arm 262 of the associated feed yoke, being retained against accidental dislodgment by cotter pins 263 which are spaced far enough from one another to avoid any possibility of interference with required relative movements of the arms 259 and 262. A compression coil spring 264 surrounds each rod 261 and bears at its opposite ends against the arms 259 and 262, serving to urge the arm 259 toward the associated cam, and thereby to maintain the cam follower in engagement with the cam. A leaf spring 265 is attached to each switch box 252 and bears against the associated arm 259. Each leaf spring 265 carries a switch operating plunger 266 which extends into the associated switch box 252 for opening and closing the switch which is mounted in the box.

One of the gun-firing circuits is diagrammatically illustrated in Fig. 4. A source of electrical energy, say a battery 267, is connected through a conductor 268 to one terminal of a manually operated switch 269. The other terminal of the switch 269 is connected through a conductor 270 to a conductor 271. One arm of the conductor 271 is connected through a conductor 272 to the switch 273 which is mounted in the switch box 252. The other terminal of the switch 273 is connected through a conductor 274 with the firing solenoid 275 of the gun 5. The current returns thence through conductors 276, 277 and 280 to the battery 267 when the circuit is closed.

A second arm of conductor 271 is connected to a conductor 281 which is connected to one terminal of the switch 282 located in the switch box 253. The other terminal of the switch 282 is connected through a conductor 283 to the firing solenoid 284 of the gun 6. The current returns thence through conductors 285, 277 and 280 to the battery 267 when the circuit is closed.

By virtue of the parallel arrangement of the switches 273 and 282, the guns may be individually controlled by their respective cams. They may be simultaneously operative to fire, simultaneously inoperative to fire, or either may be operative when the other is inoperative. Any time that the gunner is ready to fire, he simply closes the manual switch 269. If it is safe for both guns to fire, they will fire at once. In the case of repeating guns each will fire continuously as long as the switch 269 is held closed and it is safe for the particular gun to fire. When one of them enters a danger zone, the firing of it will be prevented through open-circuiting of its firing solenoid, but the firing of the other gun may be continued until it too enters a danger zone. If the switch 269 is closed and held closed at a time when both of the guns are pointed in danger zones, the first gun to leave the danger zone will begin to fire first, and the other will begin to fire as soon as it too leaves the danger zone.

The design of cams 239 and 240 is very simple. A high part of the cam moves the associated plunger 266 to open the associated firing switch 273 or 282 as the case may be, while a low part of the cam permits the associated switch to be closed yieldingly. In designing the cams it may be assumed that the guns are operable through the full 360° in azimuth, but between fixed upper and lower limits of elevation. The guns could then be aimed at any point on the surface of an imaginary cylinder surrounding the gun turret whose axis is vertical.

Either of the cams 239, 240 corresponds to this cylinder. If there is any area of the cylinder in which firing of a gun should be suppressed, a surface corresponding to that area is formed as a raised surface on the cam, so that the associated switch 273 or 282, as the case may be, will be held open when the gun controlled by the switch is pointing in that area.

There are just two thicknesses to the cam, if we neglect the transition zone between the raised area and the depressed area. The thicker area of the cam will conform in pattern to the entire region in which it would be dangerous for a given gun to fire, with a reasonable margin of safety surrounding the area actually covered by the part which is to be protected against gun firing. Outside this raised area lies a transitional zone of the cam. The switch mechanism must be so adjusted that it will surely be open when the fully raised area is effective, but if as a matter of safety it is designed to open a little early, this simply means that a marginal portion of the transitional area is added to the safety area. This method of construction and mode of operation is universally applicable even though mechanism be provided for absolutely preventing the pointing of the guns toward some portions of the surrounding imaginary cylinder corresponding to portions of the cam. The cams may also desirably be provided with raised surfaces corresponding to these latter areas, so that if through some error of assembly or faulty emergency repair the guns were erroneously permitted to operate into a portion of what ought to be a proscribed area, they still could not fire when pointing in that area.

Mechanisms for overriding the manual control of the power operated mechanism comprises one mechanism responsive only to the means for elevating the guns, to affect only the speed converting device 23 for limiting the elevation to a convenient upper limit, and a second mechanism responsive to the joint effect of rotation of the guns in azimuth (rotation of the turret) and rotation of the guns in elevation to affect both the speed converting devices 22 and 23 to limit operation of the guns in accordance with a prescribed pattern.

The elevation limiting mechanism comprises a maximum elevation cam 286 which is fixed upon the gun operating sector 193 in any suitable manner as by welding. (See particularly Figs. 11 and 13.) This cam and the mechanism operated by it is intended only to limit elevation of the guns, and not to interfere in any way with rotation of the turret.

The limit chosen is desirably near to, but not in excess of, plus 90°. There is no point in operating the gun through and beyond the plus 90° position since any direction of pointing which could be so attained is attainable with greater comfort and convenience to the gunner with positive elevation limited to the first quadrant. For example, a gun is not sighted at plus 105°, but is rotated 180° in azimuth and sighted at plus 75°. A stationary bracket 287, mounted alongside the sector 193, supports a plunger rod 288 which carries a fixed transverse pin 289 near its uper end. The pin is formed with a reduced bearing portion 290 upon which a cam follower roller 291 is rotatably mounted. Travel of the sector 193 in a counter-clockwise direction (as the parts are viewed in Figs. 2 and 11) to traverse the cam 286 beneath the follower roller 291, lifts the follower roller and the plunger 288 with it. The plunger 288 has pinned to the upper end thereof a head 292. A guide screw 292a, threaded through a wall of the bracket 287, plays in a longitudinal groove 292b of the plunger 288 and restrains the plunger against rotation, thereby maintaining the follower 291 in position to be engaged and influenced by the cam 286.

Figure 14:
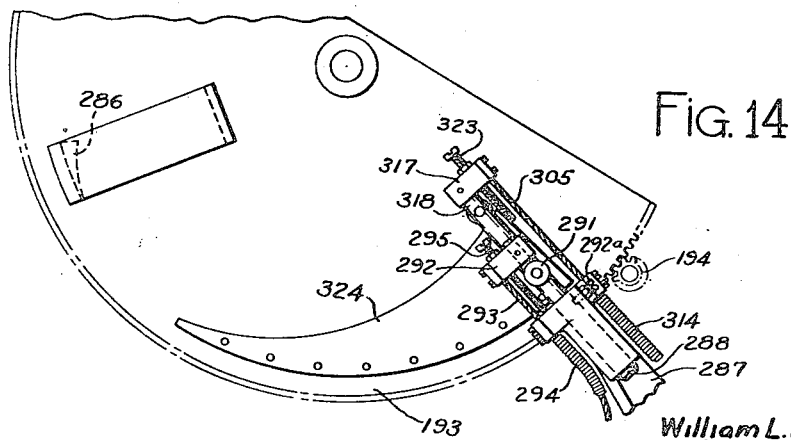
Fig. 14 is a fragmentary view in side elevation showing certain details of elevation limit mechanism.

A Bowden cable 293 is clamped at its upper end in the head 292, so that it is drawn upward as the head 292 is moved upward with the plunger 288 (see Figs. 11 and 14). A sheath 294 for the cable 293 has its upper end anchored in the bracket 287. An adjustable screw 295, threaded through the head 292, normally bears against the top face of the bracket 287, supporting the rod 288 and the roller 291 at the proper level for the roller 291 to be picked up by the cam 286.

The sheath 294 has its opposite end secured in a clamp 296 (Fig. 7) which is affixed to a stationary supporting plate 297. The plate 297 is supported by posts 298 from the base plate 13 of the power driving unit. The Bowden cable 293 extends beyond the clamp, through a hole formed in an end of arm 299 of lever 125a (see Fig. 7). A ball 300 is affixed to the free end of the cable 293.

In the normal, neutral position of the lever 125a the ball 300 is spaced away from the arm 299, providing a sufficient lost motion between the arm 299 and the Bowden cable 293 to admit of free clockwise operation of the lever 125a for lowering the guns. As the follower 291 is lifted by the cam 286 as an incident of the raising of the guns, however, the ball 300 is drawn toward and eventually to a position to return the lever 125a to neutral and thereby to reduce the output of the speed converting device 23 to zero.

During this operation of the lever 125a by the Bowden cable 293, the manual control member 8 may be released or neutralized, or it may be maintained by the operator in a position which would normally bring about an increasing elevation of the guns. The holding of the manual control member 8 in a non-neutral position detains the sector 123a in a corresponding non-neutral position. With the sector thus detained, the lever 125a may, nevertheless, be neutralized, the relative motion being accommodated by yielding of the spring 132a. The counter-clockwise movement of the lever 125a shifts the stop pin 130a toward the left, forcing the arm 126a to move toward the left. The arm 127a is prevented by the pin 124a on the sector 123a from moving with the arm 126a and the lever 125a, so that the spring 132a is placed under tension. It will be observed that the cam 286 brings about a gradual restoration of the lever 125a to neutral, so that the stopping of the sectors 192 and 193 is brought about gradually through a gradual reduction of the speed output of the converting device 23.

The mechanism for exercising a superseding control of both the converting devices 22 and 23 in accordance with a prescribed pattern comprises a cam follower 301 carried upon the bottom plate 3 of the turret which cooperates with the stationary annular cam 2. The follower 301 is rotatably mounted in a plunger 302 which is guided for vertical movement in a bracket 303 affixed to the bottom plate 3 of the turret. A tension spring 304 is connected to the upper end of the plunger 302 and to a fixed part of the turret, so that it tends to draw the plunger upward.

A Bowden cable 305 (Fig. 12) is secured to the upper end of the plunger 302 by means of a clamp 306. A sheath 307 for the cable 350 is anchored at one end to the bracket 303 by means of a clamp 308. The cable 305 passes from the sheath 307 upward through an anti-friction guide bushing 309 carried by the bracket 303 and thence upward to the clamp 306.

The opposite end of the sheath 307 is anchored by means of a clamp 310 to an arm 311 of a floating lever 312. The cable 305 passes freely through the arm 311 and freely through a stationary clamp block 313 which is stationarily mounted on plate 297. A second sheath 314 for the cable 305 is anchored at one end in the stationary clamp block 313.

The other end of the sheath 314 is anchored in the bracket 287 (see Figs. 2 and 11) by means of a clamp plate 315. The cable 305 extends upward from the sheath and is anchored by means of a clamp 316 to a head 317 affixed to a plunger rod 318. The plunger rod is guided for longitudinal movement in the bracket 287. The rod is formed with a longitudinally extending groove which loosely receives a guide screw 319 threaded through a wall of the bracket 287, for holding the rod 318 against rotation while permitting it to move longitudinally. The rod 318 carries a fixed pin 320 which includes a reduced bearing portion 321. A cam follower roller 322 is rotatably mounted on the reduced bearing portion 321. An adjustable screw 323 threaded through the head 317 bears normally against the bracket 287 and determines a normal elevation of the follower roller 322, suitable to adapt it to be picked up and displaced by a cam 324 which is affixed to the sector 193. Tension exerted upon the Bowden cable 305 by the spring 304 normally maintains the screw 323 in engagement with the bracket 287.

So long as the cam follower 301 is held up only by the spring 304 and not by the cam 2, the cam 324 can only draw the Bowden cable 305 idly through its sheaths 307 and 314. When the cams 2 and 324 act positively upon the Bowden cable 305 in opposition to one another, the length of cable contained between the distal ends of the sheaths 307 and 314 is shortened, and this forces the adjacent ends of the sheaths 307 and 314 toward one another. Since the clamp block 313 of the cable 314 is stationary, the clamp block 310 of the sheath 307 is forced to approach the clamp block 313. This carries the floating lever 312 toward the stationary clamp block 313.

The principle of operation of this portion of the mechanism may be clarified by the following explanation. Let it be supposed that at the beginning of a given operation the follower 322 stands at a definite point upon the cam 324, and that during the operation the turret is operated to swing the guns in azimuth without any change in the elevation of the guns. In that case, the cable 305 will neither be drawn out of the sheath 314 nor paid into it during the operation under consideration. The cable will not shift relative to the sheath 314 at any point throughout the length of the sheath, so that a fixed condition of sheath and cable at the clamp 313 will be maintained substantially the same as if the cable were fixed to the sheath and to the stationary clamp block 313.

Let it further be supposed that in this condition the end of sheath 307 nearest the clamp block 313 stands initially at a distance of three inches from the clamp block 313, and that the rigid structure formed by the clamp block 310 and the member 312 accounts for two inches of the three which intervene between the sheath 307 and the clamp block 313. Now the length of cable extending from the clamp block 313 to the clamp 306 is equal to three inches, plus the length of the sheath 307, plus the length of cable which extends from the clamp block 306 to the end of the sheath 307 which is nearest the clamp block 306.

Now let the operation of the turret carry the follower 301 onto a higher portion of cam 2 so that the clamp block 306 is shifted upwardly away from the initial position a distance of one inch. The clamp block 308 which holds the outer end of sheath 307 does not participate in this movement, so that the length of cable extending between the clamp block 306 and the adjacent end of sheath 307 is increased by one inch. Neither the cable 305 nor the sheath 307 is compressible. If the cable shifts one inch relative to the sheath 307 at the clamp block 308, then it shifts one inch relative to the sheath throughout the length of the sheath. In other words, the clamp block 310 with the sheath end clamped by it must shift longitudinally of the cable 305 a distance of one inch, forcing the member 312 right up against the clamp block 313.

For further analyzing the action of the cable and the sheaths, let it again be assumed that there is an initial spacing of the member 312 from the clamp block 313 equal to one inch, but in this case let it be assumed that there is no operation in azimuth but only an operation of the guns in elevation, tending to increase the length of cable which extends from the clamp 316 to the adjacent end of sheath 314.

In this case the point should be first noted that both ends of the sheath 314 are anchored in fixed position. The cable throughout its length enclosed by the sheath 314 moves on inch relative to the sheath 314. Thus, the point of the cable which was initially outside the sheath 314 and three inches from clamp block 313, moves to a distance two inches from the clamp block 313. During the operation now under consideration, however, the clamp block 306 holds the cable 305 in fixed relation to the sheath 307. That portion of the cable passing through the clamp block 308 does not shift relative to the sheath 307, and consequently no portion of the cable can shift relative to the sheath 307. Point for point the cable 305 and the sheath 307 maintain correspondence. If, then, a point on the cable which initially coincided with the end of sheath 307 nearest the clamp block 313 was initially situated three inches from the clamp block 313 and was then moved one inch closer to the clamp block 313 by a pull on the cable, it necessarily follows that the end of the sheath 307 nearest the clamp block 313 must also move one inch closer to the clamp block 313, thereby carrying the member 312 directly up against the clamp block 313.

While the conditions of the two foregoing supposititious cases are entirely possible, in actual use there will more commonly be simultaneous operations in azimuth and in elevation. The cable and sheath arrangement constitutes a differential mechanism interconnecting the two followers 301 and 322. It has been seen that the one inch separation between the member 312 and the stationary clamp block 313 may be forced to close by pulling an additional inch of cable out of the sheath 307 at the end adjacent the clamp block 306 or by pulling an additional inch of cable out of the sheath 314 at the end adjacent the clamp block 316. An equivalent result will be produced by any combination of operations of the cams 2 and 324 which cause a total of one additional inch of cable to be exposed at the distal ends of the sheaths 307 and 314.

In all of the foregoing explanation the numbers employed are, of course, purely illustrative and hypothetical, and have been chosen for the purpose of making the explanation concrete.

It is important in connection with the mode tof operation described that the distance between the clamp blocks 308 and 310 be less than the total length of sheath 307, so that the sheath 307 does not extend in a straight line. The sheath 314 actually describes a curve, also, but the operation would be the same if the sheath 314 extended in a straight line.

The lever 312 is pivotally connected at one end to the longer arm of a lever 325 which is mounted on a fulcrum pin 326 supported by a bracket 327 affixed to the plate 297. The opposite, shorter arm of the lever 325 bears against one arm of a lever 328 which is mounted on a fulcrum pin 329 carried by the bracket 327. The other arm of the lever 328 engages the left arm 330 of lever 125a. Movement of the floating lever 312 toward the stationary clamp 313 swings the lever 325 counter-clockwise, the lever 328 clockwise, and the lever 125a clockwise to or through the neutral position of the lever 125a.

The floating lever 312 is connected at its right-hand end through a pin 331 with the slotted left-hand end of the longer arm of a lever 332, which lever is mounted on a fulcrum pin 333 carried by a stationary bracket 334 affixed to the stationary plate 297. The arms of lever 332 are more nearly equal in length than the arms of lever 325. The right-hand end of the shorter arm of lever 332 is engageable with the left arm of a lever 335 which is mounted on a fulcrum pin 336 carried by the bracket 334. As the floating lever 312 is moved toward the stationary clamp 313, the lever 332 is swung clockwise and causes an abutment 337 of the left arm of the lever 332 through engagement with the left arm 338 of the lever 125 to swing the lever 125 in a clockwise direction. Such movement may be continued until the neutral position of lever 125 is reached. In the neutral position the right arm 339 of lever 125 engages the right arm of lever 335 and tends to rock the latter lever clockwise. At the same time, however, the right arm of lever 332 engages the left arm of lever 335 and tends to rock the latter lever counter-clockwise. The opposing forces acting upon the lever 335 are balanced in the neutral position of the lever 125.

It will be noted that whether or not the speed converting devices are arrested by the Bowden cable 305 and its sheaths depends upon the length of cable extending from the clamp 308 to the clamp 315. When this length of cable is of maximum value, the clamp 310 is most widely separated from the clamp 313, and both speed converting devices are free to be operated at their maximum speeds, the one for increasing the elevation of the guns and the other for rotating the turret. The amount that the cable is shortened between the clamps 308 and 315 is a measure of the amount that the clamp 310 is forced to approach the clamp 313. This shortening is equal to the sum of the instantaneously effective heights of the cams 2 and 324. The cams are so designed that both speed converting devices will have their outputs definitely reduced to zero before either of the guns can enter any danger area. The arresting action is gradual and progressive, however, so that the reduction of speed imposed by the shortening of the cable 305 is a gradual one.

Figure 7:
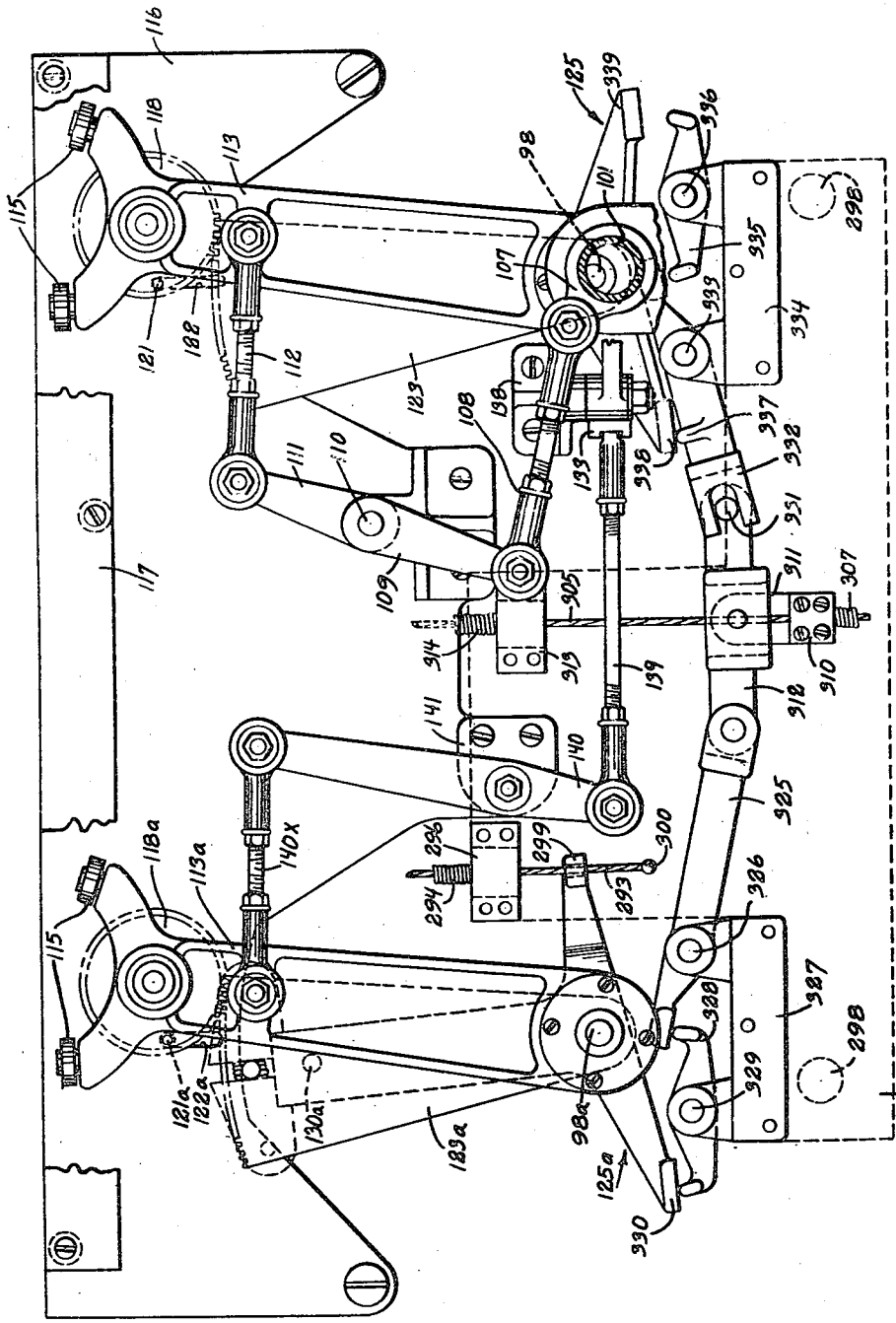
Fig. 7 is a horizontal sectional view, partly broken away, which particularly illustrates the control means for the speed converting devices.

In areas bordering a danger area the cable 305 will be shortened to a degree depending upon the speed and angle of approach to the interfering surface. In Fig. 7 it may be seen by comparing the ratios of arms 325 and 332 that the elevation conversion unit 23 will be operated first because of the lever arrangement. This arrangement is advantageous because it permits smooth and rapid skirting of danger areas.

If, for example, the downwardly pointing gun approaches an upwardly projecting danger area with the control set for, and the gun moving in azimuth only, the floating lever 312, by means of the azimuth cam and cable connections will be moved and will tend to operate the lever 125a first. Accordingly, the gun will rise and will continue to rise under the effect of the superseding control only, until the floating lever 312 is released from influence of the azimuth cam. No change in the manually controlled azimuth rate will occur during this operation. If an operator moves the guns diagonally downward toward a danger area perpendicular to the bombing surface thereof under influence of equal azimuth and elevation manual control, the azimuth and elevation control cams will be caused to operate simultaneously. The effect of the superseding control will be to first move the lever 125a to limit the rate of depression (because of the lever ratio) and then move the lever further to an extent whereby the guns will actually be elevated. No change in azimuth rate will occur unless the rate of approach is relatively great. The elevation control, in this case, will then move to its extreme elevation position. Any further tendency to move lever 312 will be transmitted to the lever 125 and will cancel the manual azimuth control. This will effectually allow the gun to clear over the obstruction. If the manual control is moved for depression only, the gun will depress until the elevation cam and follower assembly moves the floating lever 312. The lever 312, through the linkage, will overcome the manual control effort and act to neutralize lever 125a and bring the gun to rest. An operator would obviously know what had occurred and would move the control handles in a direction suitable to cancel the automatic controlling effect.

From the description of the operation of the various parts which has been given in connection with the foregoing description, the operation of the mechanism will in general be readily evident.

The operator rides the turret, holding the handle members 9. When he wishes to raise the guns he depresses the handles and when he wishes to lower the guns he raises the handles. When he wishes to rotate the turret to the left, he swings the handles to the right, and when he wishes to rotate the turret to the right he swings the handles to the left. All of the control operations are consistent with those which would be applied to the butt of a gun universally mounted intermediate its ends, in order to point the gun in various directions.

When the handles are in azimuth neutral attitude and in elevational neutral attitude, the guns and the turret remain stationary relative to the vehicle or craft upon which they are carried. A slight displacement of the handles from neutral attitude causes a slow power operation of the guns or of the guns and turret in a desired direction, but as the handles are displaced more and more from neutral, the speed of the power operation of the guns increases, not merely in proportion to the extent of displacement of the handles from neutral, but in progressively augmented relation to the extent of displacement of the handles from neutral. The displacement of the handles controls the speed, not the extent, of movement of the guns and turret, the speed being a function of the extent of displacement of the handles from neutral both with respect to operations in azimuth and operations in elevation.

By virtue of this arrangement, it is possible to operate the guns at high speed in response to a moderate extent of handle displacement when the divergence of the line of sight from the target is large, or when the angular traverse of the target is rapid, but to operate the guns very slowly and under very precise control when they are trained substantially to score a hit on the target, and the angular rate of traverse of the target with reference to the line of sight is small.

The firing of the guns is normally controlled by the manually operable switch 269 which may be embodied in the handle structure for finger operation, or may be arranged for pedal or knee operation.

Should the operator close the switch 269, however, when the gun is pointing toward a portion of the vehicle or craft upon which it is mounted, the safety patterns of the cams 239 and 240 will control the switches 273 and 282 to prevent energization of one or both of the firing solenoids 275 and 284 as conditions may require.

In the heat of combat the gunner may well overlook the fact that he is seeking to fire the guns through a portion of his own craft, or even through a member of his own crew, his attention being focused on the target. Again, the gunner may be killed or rendered unconscious in an attitude such that the switch 269 is held closed, and the handles are forced and maintained in a non-neutral position.

The safety patterns of the cams 239 and 240 constitute a safeguard against the former of these possibilities, while the superseding mechanism constitutes a safeguard for positively preventing operation of the guns into positions to point toward portions of the craft occupied by the crew. When the handles 9 are so held that they would normally cause operation of the guns into such a region, the superseding mechanism intervenes in accordance with the safety pattern determined by the combined effect of cams 2 and 324, mechanically to take the control away from the handles 9 and to prevent such unwanted and dangerous operation.

The cam 286 is capable at any time of asserting a superseding control for limiting elevation of the guns.

We have described what we believe to be the best embodiments of our invention. We do not wish, however, to be confined to the embodiments shown, but what we desire to cover by Letters Patent is set forth in the appended claims.

We claim:

1. In an aiming mechanism which includes a member to be aimed, in combination, a power motor, a progressively adjustable, mechanical, speed converting device for securing as an output from said motor various output speeds of rotation in either of two opposite directions within predetermined limits, means responsive to said converting device for driving the aimed member rotatively in linear relation to the output speed, a control member for adjusting the speed converting device, operable in either of two opposite directions from a neutral position corresponding to zero output to produce outputs in one direction or the other depending upon whether the control member is displaced in one direction or the other from the neutral position, and non-linear control connections from the control member to the speed converting device constructed and arranged to cause the output speed to be increased in progressively augmented relation to the extent of departure of the control member from neutral as the control member is moved away from the neutral position in either direction.

2. In an aiming mechanism which includes a gun to be aimed, in combination, a motor, a progressively adjustable, mechanical, speed converting device for securing as an output from said motor various output speed of rotation in either of two opposite directions within predetermined limits, said converting device comprising a pair of V-belt drives and differential gearing combining the outputs thereof to provide a single composite output, means responsive to said converting device for driving the gun rotatively in linear relation to the output speed, a manual control member for adjusting the speed converting device, operable in either of two opposite directions from a neutral position corresponding to zero output to produce outputs in one direction or the other depending upon whether the control member is displaced in one direction or the other from the neutral position, control connections from the control member to the speed converting device, and mechanism responsive to the gun operating means for at times overriding the influence of the manual control member upon the speed converting device, to prevent the pointing of the gun in a proscribed direction.

3. In an aiming mechanism which includes a member to be aimed, in combination, a motor, an uninterruptedly adjustable, mechanical, speed converting device for securing as an output from said motor output speeds of rotation in either of two opposite directions of any desired value within predetermined limits, means responsive to said converting device for driving the aimed member rotatively in linear relation to the output speed, a manual control member for adjusting the speed converting device, operable in either of two opposite directions from a neutral position corresponding to zero ouput to produce outputs in one direction or the other depending upon whether the control member is displaced in one direction or the other from the neutral position, and non-linear control connections from the manual control member to the speed converting device constructed and arranged to cause the output speed to be increased in ever augmented relation to the extent of departure of the control member from neutral as the control member is moved away from the neutral position in either direction.

4. In an aiming mechanism which includes a member to be aimed, in combination, a motor, an uninterruptedly adjustable, mechanical, speed converting device for securing as an output from said motor output speeds of rotation in either of two opposite directions of any desired value within predetermined limits, means responsive to said converting device for driving the aimed member rotatively in linear relation to such output speed, a manual control member for adjusting the speed converting device, operable in either of two opposite directions from a neutral position corresponding to zero output to produce in one direction or the other depending upon whether the control member is displaced in one direction or the other from the neutral position, and control connections from the manual control member to the speed converting device, said control connections including yieldable means for enabling the effect of the manual control member upon the converting device to be overriden at times, a cam operable in unison with the aimed member, a cam follower mounted in the path of said cam for displacement by the cam, a Bowden cable connected to the cam follower, and means actuated by the Bowden cable to override the manual control member and adjust the speed converting device independently of the manual control member under predetermined operating conditions.

5. In an aiming mechanism which includes a member to be aimed, in combination, a motor, an uninterruptedly adjustable, speed converting device of the adjustable pulley V-belt type, for securing as an output from said motor output speeds of rotation in either of two opposite directions of any desired value within predetermined limits, means responsive to said converting device for driving the aimed member rotatively in linear relation to the output speed, a control member for adjusting the speed converting device, operable in either of two opposite directions from a neutral position corresponding to zero output to produce outputs in one direction or the other depending upon whether the control member is displaced in one direction or the other from the neutral position, and non-linear control connections from the control member to the speed converting device constructed and arranged to cause the output speed to be increased in ever augmented relation to the extent of departure of the control member from neutral as the control member is moved away from the neutral position in either direction.

6. In an aiming mechanism which includes a member to be aimed, in combination, a motor, a pair of uninterruptedly adjustable, mechanical, speed converting elements independently driven by the motor, means for inversely adjusting said elements from a condition of operation in unison to increase the output speed of either and concomitantly to diminish the output speed of the other, means comprising a differential gear for combining the outputs to produce and transmit a resultant rotary output speed in either of two opposite directions to the aimed member which is a linear function of the difference of the output speeds, a control member for the speed adjusting means operable in either of two opposite directions from a neutral position corresponding to zero output to produce output operation in either of two opposite directions depending upon whether the control member is displaced in one direction or the other from the neutral position, and non-linear control connections from the control member to the speed adjusting means constructed and arranged to cause the resultant output speed to be increased in ever augmented relation to the extent of departure of the control member from neutral as the control member is moved away from the neutral position in either direction.

7. In an aiming mechanism which includes a member to be aimed, in combination, a motor, a pair of uninterruptedly adjustable, mechanical, speed converting elements of the adjustable pulley V-belt type, independently driven by the motor, means for inversely adjusting said elements from a condition of operation in unison to increase the output speed of either and concomitantly to diminish the output speed of the other, means comprising a differential gear for combining the outputs to produce and transmit a resultant rotary output speed in either of two opposite directions to the aiming device which is a linear function of the difference of the output speeds, a control member for the speed adjusting means operable in either of two opposite directions from a neutral position corresponding to zero output to produce output operation in one direction or the other depending upon whether the control member is displaced in one direction or the other from the neutral position, and non-linear control connections from the control member to the speed adjusting means constructed and arranged to cause the resultant output speed to be increased in ever augmented relation to the extent of departure of the control member from neutral as the control member is moved away from the neutral position in either direction.

8. In an aiming mechanism which includes a member to be aimed, in combination, a motor, a pair of uninterruptedly adjustable, mechanical, speed converting elements independently driven by the motor each comprising a V-belt and input and output pulleys, each of which pulleys includes an adjustable section for changing the effective width of the pulley, means for inversely adjusting said elements from a condition of operation in unison to increase the output speed of either and concomitantly to diminish the output speed of the other comprising rigid members connecting the adjustable sections of the input pulleys and of the output pulleys, respectively, and a rockable lever pivoted between the rigid members and connected to move them concurrently in opposite directions, means comprising a differential gear for combining the outputs to produce and transmit a resultant rotary output speed in either of two opposite directions to the aiming device which is a linear function of the difference of the output speeds, a control member for the speed adjusting means operable in either of two opposite directions from a neutral position corresponding to zero output to produce output operation in one direction or the other depending upon whether the control member is displaced in one direction or the other from the neutral position, and non-linear control connections from the control member to the lever constructed and arranged to cause the lever to be rocked in ever augmented relation to the extent of departure of the control member from neutral as the control member is moved away from the neutral position in either direction.

9. In an aiming mechanism which includes an aimed member mounted for movement about perpendicularly related axes, in combination, a motor, a pair of progressively adjustable, mechanical, speed converting devices driven independently by the motor for securing in each instance as an output from said motor various output speeds of rotation in either of two opposite directions within predetermined limits, means responsive to the first of said converting devices for rotating the aimed member about the first axis in linear relation to the output speed of the first device, means responsive to the second of said converting devices for rotating the aimed member about the second axis in linear relation to the output speed of the second device, a common control member for adjusting the speed converting devices, said control member being operable to the right or left from a neutral attitude corresponding to zero output of the first device to produce outputs of the first device in one direction or the other depending upon whether the control member is displaced to one side or the other of the neutral attitude, and being also operable in a vertical plane in opposite directions from a neutral attitude corresponding to zero output of the second device to produce outputs of the second device in one direction or the other depending upon the direction of the latter displacement of the control member from the neutral attitude, and non-linear control connections from the control member to each of the speed converting devices, the first constructed and arranged to cause the output speed of the first converting device to be increased in ever augmented relation to the extent of departure of the control member to the right or left from the neutral attitude, and the second constructed and arranged to cause the output speed of the second converting device to be increased in ever augmented relation to the extent of departure of the control member in a vertical plane from the neutral attitude.

10. In an aiming mechanism which includes an aimed member mounted for movement about perpendicularly related axes, in combination, a motor, a pair of uninterruptedly adjustable, mechanical, speed converting devices driven independently by the motor for securing in each instance as an output from said motor an output speed of rotation in either of two opposite directions of any desired value within predetermined limits, means responsive to the first of said converting devices for rotating the aimed member about the first axis in linear relation to the output speed of the first device, means responsive to the second of said converting devices for rotating the aimed member about the second axis in linear relation to the output speed of the second device, a common control member for adjusting the speed converting devices, said control member being operable to the right or left from a neutral attitude corresponding to zero output of the first device to produce outputs of the first device in one direction or the other depending upon whether the control member is displaced to one side or the other of the neutral attitude, and being also operable in a vertical plane in opposite directions from a neutral attitude corresponding to zero output of the second device to produce outputs of the second device in one direction or the other depending upon the direction of the latter displacement of the control member from the neutral attitude, and non-linear control connections from the control member to each of the speed converting devices, the first constructed and arranged to cause the output speed of the first converting device to be increased in ever augmented relation to the extent of departure of the control member to the right or left from the neutral attitude, and the second constructed and arranged to cause the output speed of the second converting device to be increased in ever augmented relation to the extent of departure of the control member in a vertical plane from the neutral attitude.

11. In an aiming mechanism which includes an aimed member mounted for movement about perpendicularly related axes, in combination, a motor, a pair of uninterruptedly adjustable, mechanical, speed converting devices driven independently by the motor for securing in each instance as an output from said motor an output speed of rotation in either of two opposite directions of any desired value within predetermined limits, means responsive to the first of said converting devices for rotating the aimed member about the first axis in linear relation to the output speed of the first device, means responsive to the second of said converting devices for rotating the aimed member about the second axis in linear relation to the output speed of the second device, a common control member for adjusting the speed converting devices, said control member being operable to the right or left from a neutral attitude corresponding to zero output of the first device to produce outputs of the first device in one direction or the other depending upon whether the control member is displaced to one side or the other of the neutral attitude, and being also operable in a vertical plane in opposite directions from a neutral attitude corresponding to zero output of the second device to produce outputs of the second device in one direction or the other depending upon the direction of the displacement of the control member from the neutral attitude, and non-linear control connections from the control member to each of the speed converting devices, the first constructed and arranged to cause the output speed of the first converting device to be increased in ever augmented relation to the extent of departure of the control member to the right or left from the neutral attitude, and the second constructed and arranged to cause the output speed of the second converting device to be increased in ever augmented relation to the extent of departure of the control member in a vertical plane from the neutral attitude, each of said control connections including mechanism designed to produce a law of augmentation which is symmetrical with respect to the neutral attitude of the control member.

12. In an aiming mechanism which includes a rotary turret mounted for movement about a vertical axis and includes an aimed member mounted thereon for horizontal movement in unison therewith and also for movement about a horizontal axis relative thereto, in combination, a motor mounted on the turret, a pair of uninterruptedly adjustable, mechanical, speed converting devices mounted on the turret and driven independently by the motor for securing in each instance as an output from said motor an output speed of rotation in either of two opposite directions of any desired value within predetermined limits, means responsive to the first of said converting devices for rotating the turret about its vertical axis in linear relation to the output speed of the first device, means responsive to the second of said converting devices for rotating the aimed member about its horizontal axis in linear relation to the output speed of the second device, a common control member on the turret for adjusting the speed converting devices, said control member being operable to the right or left relative to the turret from a neutral attitude corresponding to zero output of the first device to produce outputs of the first device in one direction or the other depending upon whether the control member is displaced to one side or the other of the neutral attitude, and being also operable in a vertical plane in opposite directions from a neutral attitude corresponding to zero output of the second device to produce outputs of the second device in one direction or the other depending upon the direction of the displacement of the control member from the neutral attitude, and non-linear control connections from the control member to each of the speed converting devices, the first constructed and arranged to cause the output speed of the first converting device to be increased in ever augmented relation to the extent of departure of the control member to the right or left from the neutral attitude, and the second constructed and arranged to cause the output speed of the second converting device to be increased in ever augmented relation to the extent of departure of the control member in a vertical plane from the neutral attitude.

13. An aiming mechanism which includes, in combination, a rotary turret mounted for movement about a vertical axis, a gun mounted thereon for horizontal movement in unison therewith, and also for movement about a horizontal axis relative thereto, power mechanism mounted on the turret, a pair of uninterruptedly adjustable, speed converting devices mounted on the turret and driven independently by the power mechanism for securing in each instance as an output from the power mechanism an output speed of rotation in either of two opposite directions of any desired value within predetermined limits, means responsive to the first of said converting devices for rotating the turret about its vertical axis in linear relation to the output speed of the first device, means responsive to the second of said converting devices for rotating the gun in elevation about its horizontal axis in linear relation to the output speed of the second device, a common manual control member on the turret for adjusting the speed converting devices, said control member being operable to the right or left relative to the turret from a neutral attitude corresponding to the zero output of the first device to produce outputs of the first device in one direction or the other depending upon whether the control member is displaced to one side or the other of the neutral attitude, and also being operable in a vertical plane in opposite directions from a neutral attitude corresponding to zero output of the second device to produce outputs of the second device in one direction or the other depending upon the direction of the displacement of the control member from the neutral attitude, yieldable control connections from the control member to each of the speed converting devices, and means responsive to operations of the turret and the means for operating the gun in elevation, in predetermined operated conditions thereof, to override the effect of the manual control member and assert a superseding control of the speed converting devices.

14. An aiming mechanism which includes, in combination, a rotary turret mounted for movement about a vertical axis, a gun mounted thereon for horizontal movement in unison therewith, and also for movement about a horizontal axis relative thereto, power mechanism mounted on the turret, a pair of uninterruptedly adjustable, speed converting devices mounted on the turret and driven independently by the power mechanism for securing in each instance as an output from the power mechanism an output speed of in either of two opposite directions rotation of any desired value within predetermined limits, means responsive to the first of said converting devices for rotating the turret about its vertical axis in linear relation to the output speed of the first device, means responsive to the second of said converting devices for rotating the gun in elevation about its horizontal axis in linear relation to the output speed of the second device, a common manual control member on the turret for adjusting the speed converting devices, said control member being operable to the right or left relative to the turret from a neutral attitude corresponding to the zero output of the first device to produce outputs of the first device in one direction or the other depending upon whether the control member is displaced to one side or the other of the neutral attitude, and also being operable in a vertical plane in opposite directions from a neutral attitude corresponding to zero output of the second device to produce outputs of the second device in one direction or the other depending upon the direction of the displacement of the control member from the neutral attitude, yieldable control connections from the control member to each of the speed converting devices, a cam mechanism including a follower responsive to rotation of the turret, a cam mechanism including a follower responsive to the means for operating the gun in elevation, and means responsive to the joint effect of the cam followers to override the effect of the manual control member and alter the outputs of the speed converting devices, so that predetermined areas cannot be brought within the line of fire.

15. An aiming mechanism which includes, in combination, a rotary turret mounted for movement about a vertical axis, a gun mounted thereon for horizontal movement in unison therewith, and also for movement about a horizontal axis relative thereto, power mechanism mounted on the turret, a pair of uninterruptedly adjustable, speed converting devices mounted on the turret and driven independently by the power mechanism for securing in each instance as an output from the power mechanism an output speed of rotation in either of two opposite directions of any desired value within predetermined limits, means responsive to the first of said converting devices for rotating the turret about its vertical axis in linear relation to the output speed of the first device, means responsive to the second of said converting devices for rotating the gun in elevation about its horizontal axis in linear relation to the output speed of the second device, a common manual control member on the turret for adjusting the speed converting devices, said control member being operable to the right or left relative to the turret from a neutral attitude corresponding to the zero output of the first device to produce outputs of the first device in one direction or the other depending upon whether the control member is displaced to one side or the other of the neutral attitude, and also being operable in a vertical plane in opposite directions from a neutral attitude corresponding to zero output of the second device to produce outputs of the second device in one direction or the other depending upon the direction of the displacement of the control member from the neutral attitude, yieldable control connections from the control member to each of the speed converting devices, cam mechanism including a cam follower responsive to rotation of the turret, cam mechanism including a cam follower responsive to the means for operating the gun in elevation, means differentially connecting the cam followers to combine the effects thereof, and means responsive to said differential connecting means for overriding the effect of the manual control member upon the speed converting devices and altering the outputs of the speed converting devices, so that predetermined areas cannot be brought within the line of fire.

16. An aiming mechanism which includes, in combination, a rotary turret mounted for movement about a vertical axis, a gun mounted thereon for horizontal movement in unison therewith, and also for movement about a horizontal axis relative thereto, power mechanism mounted on the turret, a pair of uninterruptedly adjustable, speed converting devices mounted on the turret and driven independently by the power mechanism for securing in each instance as an output from the power mechanism an output speed of rotation in either of two opposite directions of any desired value within predetermined limits, means responsive to the first of said converting devices for rotating the turret about its vertical axis in linear relation to the output speed of the first device, means responsive to the second of said converting devices for rotating the gun in elevation about its horizontal axis in linear relation to the output speed of the second device, a common manual control member on the turret for adjusting the speed converting devices, said control member being operable to the right or left relative to the turret from a neutral attitude corresponding to the zero output of the first device to produce outputs of the first device in one direction or the other depending upon whether the control member is displaced to one side or the other of the neutral attitude, and also being operable in a vertical plane in opposite directions from a neutral attitude corresponding to zero output of the second device to produce outputs of the second device in one direction or the other depending upon the direction of the displacement of the control member from the neutral attitude, yieldable control connections from the control member to each of the speed converting devices, cam mechanism including a cam follower responsive to rotation of the turret, cam mechanism including a cam follower responsive to the means for operating the gun in elevation, a cable connecting said cam followers, sheaths surrounding the opposite ends of the cable, stationary means anchoring the outer ends of the respective sheaths adjacent the respective cam followers, stationary means anchoring the inner end of one of the sheaths, and a superseding control mechanism for acting upon the speed converting devices to override the effect of the manual control member to alter the outputs of the speed converting devices, including an actuating member, and means anchoring the inner end of the other sheath to said actuating member.

17. An aiming mechanism which includes, in combination, a rotary turret mounted for movement about a vertical axis, a gun mounted thereon for horizontal movement in unison therewith, and also for movement about a horizontal axis relative thereto, power mechanism mounted on the turret, a pair of uninterruptedly adjustable, speed converting devices mounted on the turret and driven independently by the power mechanism for securing in each instance as an output from the power mechanism an output speed of in either of two opposite directions rotation of any desired value within predetermined limits, means responsive to the first of said converting devices for rotating the turret about its vertical axis in linear relation to the output speed of the first device, means responsive to the second of said converting devices for rotating the gun in elevation about its horizontal axis in linear relation to the output speed of the second device, a common manual control member on the turret for adjusting the speed converting devices, said control member being operable to the right or left relative to the turret from a neutral attitude corresponding to the zero output of the first device to produce outputs of the first device in one direction or the other depending upon whether the control member is displaced to one side or the other of the neutral attitude, and also being operable in a vertical plane in opposite directions from a neutral attitude corresponding to zero output of the second device to produce outputs of the second device in one direction or the other depending upon the direction of the displacement of the control member from the neutral attitude, yieldable control connections from the control member to each of the speed converting devices, a cam mechanism including a follower responsive to rotation of the turret, a cam mechanism including a follower responsive to the means for operating the gun in elevation, and means responsive to the joint effect of the cam followers to override the effect of the manual control member and alter the outputs of the speed converting devices, so that predetermined areas cannot be brought within the line of fire, a further cam mechanism including a cam follower responsive to the means for operating the gun in elevation, and means responsive to said follower to override the effect of the manual control member upon the speed converting device which operates the gun in elevation, to reduce the output of said device to zero and thereby limit the maximum elevation of the gun.

18. An aiming mechanism which includes, in combination, a rotary turret mounted for movement about a vertical axis, a gun mounted thereon for horizontal movement in unison therewith, and also for movement about a horizontal axis relative thereto, power mechanism mounted on the turret, a pair of uninterruptedly adjustable, speed converting devices mounted on the turret and driven independently by the power mechanism for securing in each instance as an output from the power mechanism an output speed of rotation in either of two opposite directions of any desired value within predetermined limits, means responsive to the first of said converting devices for rotating the turret about its vertical axis in linear relation to the output speed of the first device, means responsive to the second of said converting devices for rotating the gun in elevation about its horizontal axis in linear relation to the output speed of the second device, a common manual control member on the turret for adjusting the speed converting devices, said control member being operable to the right or left relative to the turret from a neutral attitude corresponding to the zero output of the first device to produce outputs of the first device in one direction or the other depending upon whether the control member is displaced to one side or the other of the neutral attitude, and also being operable in a vertical plane in opposite directions from a neutral attitude corresponding to zero output of the second device to produce outputs of the second device in one direction or the other depending upon the direction of the displacement of the control member from the neutral attitude, yieldable control connections from the control member to each of the speed converting devices, and means responsive to operations of the turret and the means for operating the gun in elevation, in predetermined operated conditions thereof, to override the effect of the manual control member and assert a superseding control of the speed converting devices including means for acting differentially upon the control connections of the speed converting devices.

19. An aiming mechanism which includes, in combination, a rotary turret mounted for movement about a vertical axis, a gun mounted thereon for horizontal movement in unison therewith, and also for movement about a horizontal axis relative thereto, power mechanism mounted on the turret, a pair of uninterruptedly adjustable, speed converting devices mounted on the turret and driven independently by the power mechanism for securing in each instance as an output from the power mechanism an output speed of rotation of any desired value within predetermined limits, means responsive to the first of said converting devices for rotating the turret about its vertical axis in linear relation to the output speed of the first device, means responsive to the second of said converting devices for rotating the gun in elevation about its horizontal axis in linear relation to the output speed of the second device, a common manual control member on the turret for adjusting the speed converting devices, said control member being operable to the right or left relative to the turret from a neutral attitude corresponding to the zero output of the first device to produce outputs of the first device in one direction or the other depending upon whether the control member is displaced to one side or the other of the neutral attitude, and also being operable in a vertical plane in opposite directions from a neutral attitude corresponding to zero output of the second device to produce outputs of the second device in one direction or the other depending upon the direction of the displacement of the control member from the neutral attitude, yieldable control connections from the control members to each of the speed converting devices, and means responsive to operations of the turret and the means for operating the gun in elevation, in predetermined operated conditions thereof, to override the effect of the manual control member and assert a superseding control of the speed converting devices, said superseding control means including differential connections to the converting device constructed and arranged first to effect adjustment of the second converting device to a setting which produces maximum elevation of the gun, and then to effect adjustment of the first converting device toward or to a setting which produces zero output.

20. In an aiming mechanism including a gun, in combination, means for operating the gun in elevation, means for operating the gun in azimuth, cam mechanism including a cam follower responsive to operation of the gun in elevation, cam mechanism including a cam follower responsive to operation of the gun in azimuth, and differential mechanism differentially responsive to said cam followers for preventing operation of the gun into a danger area.

WILLIAM L. MAXSON.
PETER J. McLAREN.
WILLIAM A. BLACK.
MACON FRY.

REFERENCES CITED

The following references are of record in the file of this patent:

UNITED STATES PATENTS

| Number | Name | Date |
|---|---|---|
| 1,349,140 | Martel et al. | Aug. 10, 1920 |
| 1,879,717 | Sikorsky | Sept. 27, 1932 |
| 2,179,933 | Heyer | Nov. 14, 1939 |
| 2,193,547 | Blattmann | Mar. 12, 1940 |
| 2,218,712 | Johnson | Oct. 22, 1940 |
| 2,233,918 | Fey | Mar. 4, 1941 |
| 2,237,930 | Dewandre | Apr. 8, 1941 |
| 2,243,520 | Beharrell et al. | May 27, 1941 |
| 2,330,581 | Hefel | Sept. 28, 1943 |
| 2,434,653 | Holschuh et al. | Jan. 20, 1948 |

FOREIGN PATENTS

| Number | Country | Date |
|---|---|---|
| 673,342 | France | Oct. 7, 1929 |
| 422,009 | Great Britain | Jan. 3, 1935 |
| 424,002 | Great Britain | Feb. 11, 1935 |
| 436,071 | Great Britain | June 4, 1935 |
| 787,298 | France | July 1, 1935 |
| 800,959 | France | May 11, 1936 |
| 447,931 | Great Britain | May 28, 1936 |
| 457,226 | Great Britain | Nov. 24, 1936 |
| 461,824 | Great Britain | Feb. 25, 1937 |
| 483,847 | Great Britain | Feb. 15, 1937 |
| 489,208 | Great Britain | July 21, 1938 |

Certificate of Correction

Patent No. 2,448,450. August 31, 1948.

WILLIAM L. MAXSON ET AL.

It is hereby certified that errors appear in the printed specification of the above numbered patent requiring correction as follows: Column 30, line 18, claim 17, strike out the word "rotation" and insert the same in line 17, same claim, after "speed of"; and that the said Letters Patent should be read with these corrections therein that the same may conform to the record of the case in the Patent Office.

Signed and sealed this 9th day of November, A. D. 1948.

[SEAL]

THOMAS F. MURPHY,
*Assistant Commissioner of Patents.*